(12) United States Patent
Voege

(10) Patent No.: US 9,700,945 B2
(45) Date of Patent: Jul. 11, 2017

(54) CUTTING TOOL

(71) Applicant: Hartmetall-Werkzeugfabrik Paul Horn GmbH, Tuebingen (DE)

(72) Inventor: Ruediger Voege, Rottenburg (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 179 days.

(21) Appl. No.: 14/715,174

(22) Filed: May 18, 2015

(65) Prior Publication Data

US 2015/0246397 A1 Sep. 3, 2015

Related U.S. Application Data

(63) Continuation of application No. PCT/EP2013/069781, filed on Sep. 24, 2013.

(30) Foreign Application Priority Data

Nov. 21, 2012 (DE) .................. 10 2012 111 240

(51) Int. Cl.
*B23B 29/04* (2006.01)
*B23B 27/04* (2006.01)
*B23B 27/16* (2006.01)

(52) U.S. Cl.
CPC .......... *B23B 29/043* (2013.01); *B23B 27/045* (2013.01); *B23B 27/16* (2013.01);
(Continued)

(58) Field of Classification Search
CPC ... B23B 27/16; B23B 29/043; B23B 2205/02; B23B 2260/0785; B23B 2200/123; B23B 27/04
See application file for complete search history.

(56) References Cited

U.S. PATENT DOCUMENTS 867,275 A * 10/1907 Hunter .................. B23C 5/2468
407/110
1,003,066 A * 9/1911 Riblet ..................... B23B 27/08
407/107
(Continued)

FOREIGN PATENT DOCUMENTS

| EP | 0312223 A1 | 4/1989 |
| EP | 1205273 A1 | 5/2002 |
| JP | 08-071811 | 3/1996 |

OTHER PUBLICATIONS

International Preliminary Report on Patentability (including Translation) for corresponding International Application No. PCT/EP2013/069781, issued Jun. 4, 2015.
(Continued)

*Primary Examiner* — Sara Addisu
(74) *Attorney, Agent, or Firm* — Jason H. Vick; Sheridan Ross, PC

(57) ABSTRACT

A cutting tool comprising a holder (12) having a slot-shaped, arcuate receptacle (16), with respectively a lower and an upper bearing surface (36, 38) attached to rigid clamping jaws (18, 20) of the holder (12), for the reception (16) of a cutting insert, (14) and a cutting insert (14) having an arcuate shank (22) with lower and upper locating face (32, 34), which cutting insert is arranged exchangeably in the receptacle (16), and having a cutting head (24) with cutting edge (26), which cutting head is disposed on a workpiece-side end (44) of the shank (22), wherein the arcuate receptacle (16) and the arcuate shank (22), measured respectively on the lower bearing surface (36) of the receptacle (16) and the lower locating face (32) of the cutting insert (14), extend respectively over at least 90°, wherein the receptacle (16) extends over a larger angular range than the shank (22) of the cutting insert (14), and wherein the shank (22) is held in the receptacle (16) such that the holder-side end (28) of the
(Continued)

shank (22) is distanced from the holder-side end (30) of the receptacle (16).

20 Claims, 13 Drawing Sheets

(52) U.S. Cl.
CPC ......... *B23B 27/04* (2013.01); *B23B 2200/123* (2013.01); *B23B 2205/02* (2013.01); *B23B 2260/0785* (2013.01); *Y10T 407/22* (2015.01); *Y10T 407/24* (2015.01)

(56) References Cited

U.S. PATENT DOCUMENTS

| | | | | |
|---|---|---|---|---|
| 1,080,422 A * | 12/1913 | Cousot | ............... | B23B 27/08 407/109 |
| 1,455,968 A * | 5/1923 | Proctor | ............... | B23D 61/16 83/845 |
| 1,575,315 A * | 3/1926 | Bowman | ............... | E21C 35/193 299/102 |
| 1,608,182 A * | 11/1926 | Pospiech | ............... | B23D 61/06 83/841 |
| 2,203,104 A * | 6/1940 | Reaney | ............... | B23B 27/16 407/108 |
| 2,329,872 A * | 9/1943 | Brownlee | ............... | B23B 27/08 407/110 |
| 2,870,523 A * | 1/1959 | Richard | ............... | B23B 27/1629 407/107 |
| 3,646,649 A * | 3/1972 | Oaks | ............... | B23B 27/04 407/101 |
| 3,754,309 A * | 8/1973 | Jones | ............... | B23B 27/007 407/107 |
| 3,887,975 A * | 6/1975 | Sorice | ............... | B23C 5/2265 407/106 |
| 3,911,543 A * | 10/1975 | Sorice | ............... | B23B 27/1625 407/107 |
| 4,443,136 A * | 4/1984 | Kemmer | ............... | B23B 27/083 407/110 |
| 4,462,725 A * | 7/1984 | Satran | ............... | B23B 27/04 407/108 |
| 4,558,974 A * | 12/1985 | Pano | ............... | B23B 27/045 407/110 |
| 4,580,930 A * | 4/1986 | Zinner | ............... | B23B 27/04 407/110 |
| 4,709,737 A * | 12/1987 | Jonsson | ............... | B23B 27/1685 144/208.8 |
| 4,738,570 A * | 4/1988 | Wertheimer | ............... | B23C 5/006 407/50 |
| 4,834,592 A * | 5/1989 | Niebauer | ............... | B23B 27/045 407/100 |
| 4,887,945 A * | 12/1989 | Pano | ............... | B23B 27/04 407/108 |
| 4,938,640 A * | 7/1990 | Pano | ............... | B23B 27/08 407/110 |
| 4,992,007 A * | 2/1991 | Satran | ............... | B23B 27/045 407/110 |
| 5,076,738 A * | 12/1991 | Pano | ............... | B23B 27/04 407/102 |
| 5,100,269 A * | 3/1992 | Lyon | ............... | B23B 27/045 407/107 |
| 5,697,271 A * | 12/1997 | Friedman | ............... | B23B 27/04 407/109 |
| 5,743,162 A * | 4/1998 | Sundstrom | ............... | B23C 5/08 83/676 |
| 5,795,109 A * | 8/1998 | Jonsson | ............... | B23B 27/04 407/110 |
| 5,846,032 A * | 12/1998 | Murakami | ............... | B23B 27/1622 407/102 |
| 5,934,843 A * | 8/1999 | Brask | ............... | B23B 27/04 407/106 |
| 5,980,165 A * | 11/1999 | Hansson | ............... | B23B 27/04 407/107 |
| 6,065,906 A * | 5/2000 | Hansson | ............... | B23B 27/04 407/107 |
| 6,086,291 A * | 7/2000 | Hansson | ............... | B23B 27/04 407/110 |
| 6,116,823 A * | 9/2000 | Mihic | ............... | B23C 5/08 407/109 |
| 6,139,227 A * | 10/2000 | Schafer | ............... | B23B 27/04 407/109 |
| 6,234,727 B1 * | 5/2001 | Barazani | ............... | B23B 27/04 407/110 |
| 6,244,790 B1 * | 6/2001 | Kingdom | ............... | B23B 27/045 407/108 |
| 6,270,292 B1 * | 8/2001 | Satran | ............... | B23C 5/2204 407/113 |
| 6,334,742 B1 * | 1/2002 | Shiraiwa | ............... | B23B 27/04 407/107 |
| 6,579,044 B1 * | 6/2003 | Trenkwalder | ............... | B23B 27/04 407/110 |
| 6,974,283 B2 * | 12/2005 | Oettle | ............... | B23B 29/043 407/107 |
| 7,069,969 B2 * | 7/2006 | Knappett | ............... | B27G 13/005 144/176 |
| 7,163,361 B2 * | 1/2007 | Hecht | ............... | B23B 29/043 407/109 |
| 7,246,974 B2 * | 7/2007 | Hansson | ............... | B23B 27/04 407/109 |
| 7,264,424 B2 * | 9/2007 | Hansson | ............... | B23B 27/04 407/107 |
| 7,597,508 B2 * | 10/2009 | Hecht | ............... | B23B 27/04 407/101 |
| 8,317,434 B2 * | 11/2012 | Oettle | ............... | B23C 5/08 407/109 |
| 8,647,029 B2 * | 2/2014 | Hecht | ............... | B23B 27/045 407/107 |
| 8,678,718 B2 * | 3/2014 | Hecht | ............... | B23B 27/1614 407/104 |
| 8,708,613 B2 * | 4/2014 | Hecht | ............... | B23B 27/007 407/103 |
| 9,050,658 B2 * | 6/2015 | Hecht | ............... | B23B 27/04 |
| 2002/0054792 A1 * | 5/2002 | Hansson | ............... | B23B 27/04 407/72 |
| 2002/0057950 A1 * | 5/2002 | Hecht | ............... | B23B 27/007 407/30 |
| 2002/0081165 A1 * | 6/2002 | Hecht | ............... | B23C 5/08 407/110 |
| 2002/0176754 A1 * | 11/2002 | Barazani | ............... | B23B 27/04 407/42 |
| 2005/0238444 A1 * | 10/2005 | Virtanen | ............... | B23B 27/04 407/110 |
| 2006/0062640 A1 * | 3/2006 | Kugler | ............... | B23B 27/04 407/117 |
| 2006/0120812 A1 * | 6/2006 | Hecht | ............... | B23B 27/04 407/48 |
| 2014/0186130 A1 * | 7/2014 | Hecht | ............... | B23B 27/007 407/100 |
| 2015/0086282 A1 * | 3/2015 | Zeeb | ............... | B23B 27/04 407/34 |
| 2015/0246397 A1 * | 9/2015 | Voege | ............... | B23B 29/043 407/66 |

OTHER PUBLICATIONS

International Search Report (Including Translation) for corresponding International Application No. PCT/EP2013/069781, issued Jan. 8, 2014.
Written Opinion for corresponding International Application No. PCT/EP2013/069781, issued Jan. 8, 2014.

* cited by examiner

CUTTING TOOL

CROSS REFERENCES TO RELATED APPLICATIONS

This application is a continuation of International Patent Application PCT/EP2013/069781, filed on Sep. 24, 2013 designating the U.S., which international patent application has been published in German language and claims priority to German patent application DE 10 2012 111 240.1, filed on Nov. 21, 2012. The entire contents of these priority applications are incorporated herein by reference.

BACKGROUND OF THE INVENTION

This disclosure relates to a cutting tool comprising a holder and a cutting insert arranged exchangeably in the holder. The disclosure further relates to the cutting insert for such a cutting tool and to the holder for this cutting tool.

Cutting tools of this type are generally used in metal-machining applications, in particular in milling or turning applications. Cutting tools according to the present disclosure are used, in particular, for plunge-cut turning or longitudinal turning. In order to ensure optimal machining properties, a, from a mechanical aspect, stable insert seat, i.e. a mechanically stable reception of the cutting insert within the tool holder, is of huge importance. To this end, the employed cutting inserts are clamped in place or held clamped in a receptacle, provided in the tool holder, between two clamping jaws. A further important aspect which it is important to ensure is fast and simple exchangeability of the cutting insert, since this has to be frequently exchanged due to wear.

EP 0 312 223 A1 shows a tool comprising a substantially prismatically shaped cutting insert, which has a concave top side and a convex bottom side. The cutting insert is here disposed between a rigid lower clamping jaw and an elastically expandable upper clamping jaw in the holder. The clamping force for clamping the cutting insert between these two clamping jaws is generated by a clamping screw. In order to be able to release the cutting insert from the holder in the event of an exchange, the clamping screw must therefore be manually loosened and then manually retightened as soon as a new cutting insert is inserted in the holder. This is not only laborious, but also time-consuming. Particularly in cramped installation situations, which frequently arise in machine tools, this is often possible only with great difficulty, sometimes even not at all possible, without removing the holder itself from its clamping.

EP 1 205 273 A1 shows a further cutting tool, which consists of a disk-shaped or blade-shaped basic element having at least one recess for the reception of a cutting insert. The cutting insert is exchangeably clamped in place by an elastically expandable clamping arm, which forms the upper locating face of the recess. The cutting insert and the recess are constructed in positive locking design on their mutual locating faces. As a result, a so-called "self-clamping principle" is realized. A clamping screw as is necessary according to EP 0 312 223 A1 can thereby be dispensed with. In order to be able to exchange the cutting insert, the upper clamping arm must here be manually expanded. It has been shown that in such a case an enduringly stable insert seat cannot always be guaranteed. A frequent expansion of the upper clamping arm can occasionally lead to cases of material fatigue, whereby the clamping force between holder and cutting insert would not be permanently guaranteed.

Due to the essential elastic properties of the upper clamping jaw, an expandable slot which opens out into the holder-side end of the cutting insert receptacle is respectively necessary both in the tool known from EP 0 312 223 A1 and in the tool known from EP 1 205 273 A1. Without these expandable slots, the upper clamping jaws would respectively be rigidly configured, so that they could no longer be expanded, or only with huge force expenditure. Although such expansion slots should not fundamentally be regarded as disadvantageous, the installation space which has to be provided on the holder is nevertheless thereby increased, with the result that compact tools or compact holders can be guaranteed in such an embodiment only with great difficulty. Moreover, the provision of such an expansion slot demands a further machining step in the manufacture of such a holder. The production of such expansion slots can occasionally be relatively complex. Moreover, care must here be taken to ensure that the overall stability of the clamping head is maintained despite the expansion slot.

It should further be pointed out that, in both above-stated tools known from the prior art, the cutting insert bears respectively with its holder-side face against the tool holder. To this end, in both tools locating faces are provided in the floor of the cutting insert receptacle. In the tool which is known from EP 0 312 223 A1, an extra limit stop element is even arranged for this purpose in the floor of the cutting insert receptacle. In both cases, as a result of such a limit stop or as a result of such a contact, a sufficiently exact tip height can be realized only by means of very narrow production tolerances.

SUMMARY OF THE DISCLOSURE

It is thus an object to provide a cutting tool of the type stated in the introduction, which, in contrast to the prior art, is distinguished by a compact design and in which the cutting insert can still be easily exchanged. In particular, a compact and yet mechanically very stable insert seat is here intended to be realized.

According to a first aspect, a cutting tool is presented which comprises:

a cutting insert having an arcuate shank and a cutting head which is arranged on a first end of the shank and comprises a cutting edge, wherein the shank comprises an upper locating face and a lower locating face, wherein the lower locating face extends over an angular range of more than 90°, and a holder having a rigid upper clamping jaw and a rigid lower clamping jaw which together define a slot-shaped, arcuate receptacle for receiving the cutting insert, wherein the cutting insert may be inserted into the holder at a front end of the receptacle, wherein the receptacle terminates within the holder at a back end, wherein the receptacle has an upper bearing surface which is arranged at the upper clamping jaw, wherein the upper bearing surface rests against the upper locating face of the cutting insert when the cutting insert is inserted into the holder, and wherein the receptacle has a lower bearing surface which is arranged at the lower clamping jaw, wherein the lower bearing surface rests against the lower locating face of the cutting insert when the cutting insert is inserted into the holder, and wherein the lower bearing surface extends over an angular range of more than 90°;

wherein the receptacle of the holder extends over a larger angular range than the shank of the cutting insert, and wherein the shank of the cutting insert is held in the receptacle of the holder such that a second end of the shank opposite the first end is distanced from the back end of the receptacle.

According to a further aspect, a cutting insert is presented for a cutting tool which comprises a holder with a rigid upper clamping jaw and a rigid lower clamping jaw which together define a slot-shaped, arcuate receptacle for receiving the cutting insert, wherein the cutting insert may be inserted into the holder at a front end of the receptacle, wherein the receptacle terminates within the holder at a back end, wherein the cutting insert has an arcuate shank and a cutting head which is arranged on a first end of the shank and comprises a cutting edge, wherein the shank comprises an upper locating face and a lower locating face, wherein the lower locating face extends over an angular range of more than 90°, wherein the shank of the cutting insert extends over a smaller angular range than the receptacle of the holder, and wherein the shank of the cutting insert is configured such that it is held in the receptacle of the holder in a way that a second end of the shank opposite the first end is distanced from the back end of the receptacle.

According to a still further aspect, a holder for a cutting tool is presented, wherein the holder comprises a rigid upper clamping jaw and a rigid lower clamping jaw which together define a slot-shaped, arcuate receptacle for receiving a cutting insert which comprises an arcuate shank and a cutting head which is arranged on a first end of the shank and comprises a cutting edge, wherein the shank comprises an upper locating face and a lower locating face, wherein the lower locating face extends over an angular range of more than 90°, wherein the cutting insert may be inserted into the holder at a front end of the receptacle, wherein the receptacle terminates within the holder at a back end, wherein the receptacle has an upper bearing surface which is arranged at the upper clamping jaw, wherein the upper bearing surface rests against the upper locating face of the cutting insert when the cutting insert is inserted into the holder, and wherein the receptacle has a lower bearing surface which is arranged at the lower clamping jaw, wherein the lower bearing surface rests against the lower locating face of the cutting insert when the cutting insert is inserted into the holder, and wherein the lower bearing surface ex-tends over an angular range of more than 90°;

wherein the receptacle of the holder extends over a larger angular range than the shank of the cutting insert, and wherein the holder is configured such that the shank of the cutting insert is held in the receptacle of the holder in a way that a second end of the shank opposite the first end is distanced from the back end of the receptacle.

Both the shank of the cutting insert and the receptacle on the tool holder are thus of arcuate construction. The clamping jaws provided on the tool holder are rigidly configured, so that the clamping jaws, in contrast to the prior art, do not have to be expanded for the insertion or exchange of the cutting insert. In the insertion procedure, the cutting insert is merely pushed in between these rigid clamping jaws or, due to the arcuate shape, is turned or pivoted, so to speak, into the receptacle of the holder. A self-clamping of the cutting insert between the rigid clamping jaws is hereupon obtained. The cutting insert then bears with its lower and upper locating faces against the corresponding lower and upper bearing surfaces of the holder receptacle.

Because the receptacle extends over a larger angular range than the shank of the cutting insert, the holder-side end of the shank, in the mounted state, is distanced from the holder-side end of the receptacle. On the holder-side face situated opposite the workpiece-side end of the cutting insert or of the shank, the cutting insert thus has no contact with the holder. No limit stop is provided at this place in the herein presented tool.

In contrast to the abovementioned tools from the prior art, the following differences and the following resulting advantages of the presented tool are thus obtained: The clamping jaws of the holder are of substantially rigid configuration. In particular, the upper clamping jaw, too, is in this case rigidly configured. This leads not only to a mechanically more stable insert seat. An extra clamping means, such as, for instance, a clamping screw, can thereby be dispensed with. Nor is an expansion of the upper clamping jaw necessary for the insertion of the cutting insert. This is merely pushed into the receptacle of the tool holder as far as the clamping point. An insertion or an exchange of the cutting insert is thereby made substantially easier.

From the substantially rigid construction of the clamping jaws, it also follows that in the present case there is no need for any expansion slots, which would have to be additionally provided in the holder. This simplifies the production of the holder. The fundamental advantage consists, however, in the fact that the size of the clamping head is thereby able to be hugely reduced. This ultimately enables a very compact construction of the clamping head or of the holder, and thus also of the tool as a whole. The material expenditure is also thereby reduced. It is perfectly obvious that this also economizes on production costs.

As a result of the provided positive locking contact between the lower and upper locating faces of the cutting insert and the lower and upper locating faces of the cutting insert receptacle, an exactly defined insert seat is achieved even without a face stop (on the holder-side face of the cutting insert shank).

Self-evidently, by the above-stated "rigid clamping jaws" are understood substantially rigid clamping jaws. Of course, due to the naturally occurring elasticity of the holder material (for instance steel), a small mutual elasticity of the two clamping jaws is nevertheless present. By "rigid clamping jaws" should here be understood clamping jaws which are not designed to be expanded with low or moderate force expenditure, since, as already mentioned above, this is in the present case not necessary for the insertion or exchange of the cutting insert.

In a refinement, the lower bearing surface and the lower locating face have an equal-sized first radius of curvature. Similarly, the upper bearing surface and the upper locating face preferably have an equal-sized second radius of curvature.

Corresponding contact and bearing surfaces of respectively the cutting insert and the holder therefore have, at least in some places, an equal curvature. The terms "first radius of curvature" and "second radius of curvature" do not relate to their number, but serve merely to conceptually differentiate between the different radii of curvature. Self-evidently, the first radius of curvature of the lower locating face and of the lower bearing surface is larger than the second radius of curvature of the upper locating face and of the upper bearing surface.

The provided equal-sized radii of curvature on the holder and on the shank of the cutting insert have the purpose, in particular, that between the locating faces of the cutting insert shank and the bearing surfaces of the holder, at least in some places, a form closure is obtained. As already mentioned above, this positive locking contact enables a fixed and mechanically stable insert seat. An unintentional release of the cutting insert during the machining is virtually impossible. As a result of the provided arcuate configuration of the cutting insert and as a result of the intended type of clamping within the holder, an unintentional release of the cutting insert during a resetting motion of the tool from the workpiece is effectively prevented. It should also be mentioned that the arcuate configuration of the cutting insert is constructed in such a way that the upper locating face of the cutting insert shank is convexly shaped and the lower locating face of the cutting insert shank is concavely shaped.

In a further refinement, at least one bearing surface of the receptacle is configured straight in the region of the holder-side end of the receptacle. According to this refinement, also at least one locating face of the shank is configured straight in the region of the holder-side end of the shank. According to this variant, these straightly configured bearing and locating faces correspond with one another. Both surfaces, both the straight bearing surface of the receptacle and the straight locating face of the cutting insert shank, are thus disposed in the region of the holder-side end, i.e. in the region of the rear end of the receptacle or of the shank.

Preferably, respectively a part of the upper bearing surface of the holder and respectively a part of the upper locating face of the cutting insert is configured straight. By "straight" is understood, in the present case, a non-curved part of the contact or bearing surfaces which deviates from the arcuate form. Preferably, a first section of the upper bearing surface of the holder, which first section is located in the region of the workpiece-side end, is thus arcuately (curvedly) configured, and a second section of the upper bearing surface provided on the holder, which second section is located in the region of the holder-side end of the receptacle, is thus rectilinearly, i.e. non-curvedly configured. Correspondingly thereto, also the cutting insert, in a first section of the upper locating face (in the region of the workpiece-side end), is curvedly or arcuately configured and, in a second section of the upper locating face (in the region of the holder-side end), is rectilinearly or non-curvedly configured.

In the procedure of inserting the cutting insert into the holder, the cutting insert is pushed or pivoted into the receptacle provided for this purpose on the holder, to the point where the straightly or non-curvedly configured sections of the upper locating face and of the upper bearing surface bear one against the other. As a result, a substantially plane surface contact is achieved. This produces an exactly defined insert seat and, connected thereto, also an exactly defined tip height of the cutting edge. A limit stop on the holder-side face situated opposite the workpiece-side face of the cutting insert (as is the case in the abovementioned tools from the prior art) is thus not intended here.

In a further refinement, the receptacle of the holder tapers in the region of the holder-side end of the receptacle. Similarly, the shank preferably tapers in the region of the holder-side end of the shank.

Such tapering of the receptacle and of the cutting insert shank in the region of the holder-side end is preferably achieved by the abovementioned straight sections of the upper locating face and of the upper bearing surface. In the same angular range, namely both the lower bearing surface provided on the lower clamping jaw and the lower locating face provided on the shank of the cutting insert is additionally curvedly or arcuately configured. The, in this region, arcuate or curved configuration of the lower contact and the, in the same region, comparatively straight or non-curved configuration of the upper contact thus results in a tapering of the cutting insert and in a tapering of the receptacle in the region of the holder-side end. Due to this tapering, the cutting insert can be inserted relatively easily into the holder, wherein the clamping force generated between the holder and the cutting insert increases up to the point where the end position in which the straight upper contact and bearing surfaces bear one against the other is reached.

As a result of the pushing or pivoting of the cutting insert into the receptacle of the holder, a clamping is thus realized without a face stop. The cutting insert is here mechanically secured in the receptacle of the holder, so to speak, by jamming or wedging. Even if the clamping force of the clamping jaws were to abate due to wear and tear, then sufficient clamping force is nevertheless present, which guarantees a mechanically stable and secure insert seat. In this case, the cutting insert would namely be pressed only slightly further into the receptacle (possible, since no face stop is present). A thereby formed slight vertical offset of the cutting edge is virtually negligible.

In a further refinement, the clamping jaws of the holder have a lower clamping jaw bearing against the lower locating face of the cutting insert, and an upper clamping jaw bearing against the upper locating face of the cutting insert, wherein on the workpiece-side end of the lower clamping jaw, adjacent to the receptacle, is provided a projection, which has a support surface, running parallel to the cutting edge, as a limit stop for the cutting head.

In this refinement, a positive locking contact is thus provided not on the holder-side end, but on the workpiece-side end of the receptacle. For this purpose, a support surface serving as a mechanical limit stop is provided on the workpiece-side end of the receptacle in extension of the lower bearing surface of the holder. This support surface is preferably constituted by a planar surface. Accordingly, the cutting insert has a thereto corresponding counterbearing surface, which is disposed on the workpiece-side end of the cutting insert shank, adjacent to the lower locating face. This counterbearing surface runs preferably parallel to the cutting edge of the cutting insert. It is disposed, so to speak, directly beneath the cutting edge.

In the mounted state a positive locking contact between the bearing surface disposed in the front region of the holder receptacle and the counterbearing surface disposed beneath the cutting edge on the shank of the cutting insert is achieved in this refinement as well. In the end position, these two surfaces bear flatly one against the other. An extra limit stop on the workpiece-side face of the cutting insert is not necessary.

In a further refinement, it is provided that the first radius of curvature of the lower bearing surface and the first radius of curvature of the lower locating face have different center points, and/or that the second radius of curvature of the upper bearing surface and the second radius of curvature of the upper locating face have different center points.

As already mentioned above, the first radius of curvature of the lower bearing surface and the first radius of curvature of the lower locating face is preferably equally sized. Similarly, the second radius of curvature of the upper bearing surface and the second radius of curvature of the upper locating face is preferably equally sized. As a result of a small offset of the centers of curvature or centers of radius, an additional jamming or wedging of the cutting insert within the holder receptacle is achieved. The centers of curvature or centers of radius are here preferably mutually offset by just a few hundredths. This is already sufficient to achieve an enduringly stable jamming. Nor should the offset between the center points of the radii of curvature should be excessively large, since otherwise the cutting insert could no longer, or only with very high force expenditure, be introduced between the rigid clamping jaws of the holder.

In a further refinement, it is provided that the first radius of curvature of the lower bearing surface and the second radius of curvature of the upper bearing surface have different center points, and/or that the first radius of curvature of the lower locating face and the second radius of curvature of the upper locating face have different center points.

Preferably, the center points of the radii of curvature of the two bearing surfaces provided on the holder are thus also mutually offset. Similarly, this center point offset is also provided between the radii of curvature of the lower and upper locating faces provided on the cutting insert. The mutual offset of the centers of radii of the two bearing surfaces and the mutual offset of the centers of radii of the two locating faces is here preferably precisely opposed, which leads to an additional increase in the clamping force between the cutting insert and the holding receptacle.

The further the cutting insert is thus pushed into the holding receptacle, the more the clamping force between these increases until they are fully wedged together. The aforementioned mechanical limit stop between the counter-bearing surface, provided beneath the cutting edge, of the cutting insert and the support surface provided on the workpiece-side end of the lower clamping jaw here serves as an end stop.

In a further refinement, the cutting head, in at least a direction transversely to the lead-in direction of the shank, is configured wider than the size of the opening of the receptacle in this direction.

This has substantially the purpose that collisions between the workpiece and the front part of the holder are avoided. In particular in plunge-cut turning, the workpiece should be machined merely with the cutting edge of the cutting insert and the holder should freewheel. Insofar as the cutting head, as described above, is configured wider than the receptacle provided on the holder, an undesirable collision between the workpiece and the holder is virtually impossible.

In a further refinement, it is provided that the lower bearing surface and the lower locating face have a corresponding cross-sectional profile, and/or that the upper bearing surface and the upper locating face have a corresponding cross-sectional profile.

The upper and lower contact and bearing surfaces preferably have a V-shaped cross-sectional profile. The upper locating face of the cutting insert shank here preferably has a convex V-shaped cross-sectional profile, and the upper bearing surface of the tool holder has, correspondingly thereto, a concave V-shaped cross-sectional profile. Similarly, this is provided also on the lower locating face of the cutting insert and the lower bearing surface of the tool holder. However, this can also equally well be reversed, so that, alternatively thereto, the two locating faces of the cutting insert shank have a concave V-shaped cross-sectional profile, and the two bearing surfaces of the tool holder have, correspondingly thereto, a convex V-shaped cross-sectional profile. Similarly, the upper locating face of the cutting insert shank can have a concave V-shaped cross-sectional profile, and the lower locating face of the cutting insert shank can have a convex V-shaped cross-sectional profile, wherein the upper and lower bearing surface of the tool holder have thereto corresponding cross sections. Each locating face on the cutting insert thus preferably has two flanks arranged transversely to each other, which correspond with the flanks provided on the respective bearing surface of the holder and arranged transversely to each other.

Of course, other cross-sectional profiles, i.e., for instance, other prismatic cross sections of the contact or bearing surfaces, are also possible. V-shaped contact or bearing surfaces have the advantage that the cutting insert is secured in the receptacle against laterally arising forces and, accordingly, cannot slide laterally, i.e. parallel to the cutting edge, out of the tool holder.

Preferably, the shank protrudes laterally on at least one side over the receptacle and has there, at least in some regions, a wider cross section than the receptacle. In practice, the shank of the cutting insert preferably protrudes on both sides laterally over the receptacle. This has the purpose, once again, of avoiding undesirable collisions of the workpiece with the holder itself.

In a further refinement, it is preferably provided that a first borehole for the introduction of a first pin of an assembly lever is provided on the holder-side end of the receptacle, and a second borehole for the introduction of a second pin of the assembly lever is provided in the holder.

For the installation or removal of the cutting insert, a relatively simply configured assembly lever can be used. This is required merely to clamp the cutting insert up to the limit stop in the holder in the course of installation, or to release this clamping force between the holder and the cutting insert in the course of removal. The above-described boreholes here serve as points of engagement, in which the transverse pins provided on the assembly lever can engage. Through a rotary movement of the assembly lever around the second borehole provided in the holder, the cutting insert, as shown in the following Figures, can be easily released from the holder or clamped therein.

In a further refinement, the lower locating face of the arcuate shank has a first locating portion, which extends over a first angular range of the arcuate shank and has a first radius of curvature. In addition, the lower locating face of the arcuate shank has a second locating portion, which extends over a second angular range of the arcuate shank and has a second radius of curvature. The second radius of curvature is unequal to the first radius of curvature. Moreover, the first radius of curvature of the first locating portion and the second radius of curvature of the second locating portion have different center points. The existing portions of the lower locating face are designated in the present case as locating portions. These represent arcuate segments or parts of the lower locating face.

In this refinement, the clamping between the cutting insert and the tool holder, compared to the aforementioned variants, is thus achieved in yet another manner. Here an additional clamping effect is achieved, in particular, by different curvatures being provided along the periphery of the lower locating face of the cutting insert. The first portion (first locating portion) preferably has a lesser curvature than the second portion (second locating portion). Accordingly, the first radius of curvature is preferably larger than the second radius of curvature. The first portion here forms the front region of the cutting insert shank, whereas the second portion forms the rear region of the cutting insert shank. The second portion thus has a lesser distance from the holder-side end of the shank than the first portion.

The cutting insert shank thus tapers in its rear region virtually in a wedge shape. When the cutting insert is pushed or screwed into the arcuate receptacle of the tool holder, the clamping force generated on the basis of this wedging effect thus steadily increases with increasing screwing or insertion up to the point where the final position of the cutting insert is reached. It is here important to bear in mind that the curved portions (first and second locating portion) of the lower locating face have different centers of curvature, i.e. are not mutually concentric. This center point offset allows the two radii of curvature to be further differently sized. The described wedging effect is thereby improved still further.

Preferably, the first locating portion passes directly into the second locating portion. The transition between the first and the second portion occurs preferably in the region of the apex line of the lower locating face, i.e. at the lowest point thereof. This transition between the first portion and the second portion is preferably a tangential transition, so that here no discontinuities whatever ensue on the lower locating face of the cutting insert shank.

In accordance with the lower locating face provided on the cutting insert shank, the lower bearing surface of the receptacle of the tool holder is also preferably divided into at least two portions. The lower bearing surface of the receptacle preferably has a first portion (referred to as the first bearing portion), which extends over a first angular range of the arcuate receptacle. Similarly, the lower bearing surface also has a second portion (referred to as the second bearing portion), which extends over a second angular range of the arcuate receptacle and has a second radius of curvature. The second radius of curvature differs from the first radius of curvature. Here too, the first radius of curvature of the first bearing portion and the second radius of curvature of the second bearing portion have different center points.

It should be mentioned that the term "bearing portion" refers in the present case to a part-segment of the lower bearing surface of the receptacle. Although these portions are likewise constituted by locating portions, in the present case the term "bearing portion" is used in relation to the lower bearing surface of the receptacle in order to linguistically differentiate these portions from the locating portions provided on the bottom side of the cutting insert shank.

In contrast to the two locating portions provided on the cutting insert shank, the two bearing portions provided correspondingly on the receptacle of the tool holder do not pass directly one into the other. Preferably, the first bearing portion provided on the receptacle of the tool holder is separated from the second bearing portion by a recess provided in the lower bearing surface. Such a recess prevents direct contact between the cutting insert and the receptacle at their respective lowermost point or at their apex points. A contact at this site, in connection with a mechanically exactly defined insert seat, would tend to be disadvantageous. As a result of the recess provided at this site on the receptacle, the cutting insert, in much the same way as in a three-point support, can bear in the mounted state along three defined portions against the tool holder. Consequently, in the mounted state the cutting insert bears with its upper locating face on its top side against the corresponding upper bearing surface of the tool holder, and touches on its bottom side the lower bearing surface of the tool holder in the front region along the first locating portion and in the rear region along the second locating portion of the lower locating face. At the transition between the first locating portion and the second locating portion of the lower locating face of the cutting insert shank (i.e. in its middle region), no contact is provided, however, between the lower bearing surface of the receptacle and the lower locating face of the cutting insert shank.

The above-mentioned features and those yet to be explained in the following text are usable not only in the combination given in each case but also in other combinations or on their own, without departing from the spirit and scope of the present disclosure.

DESCRIPTION OF PREFERRED EMBODIMENTS

Figure 1:
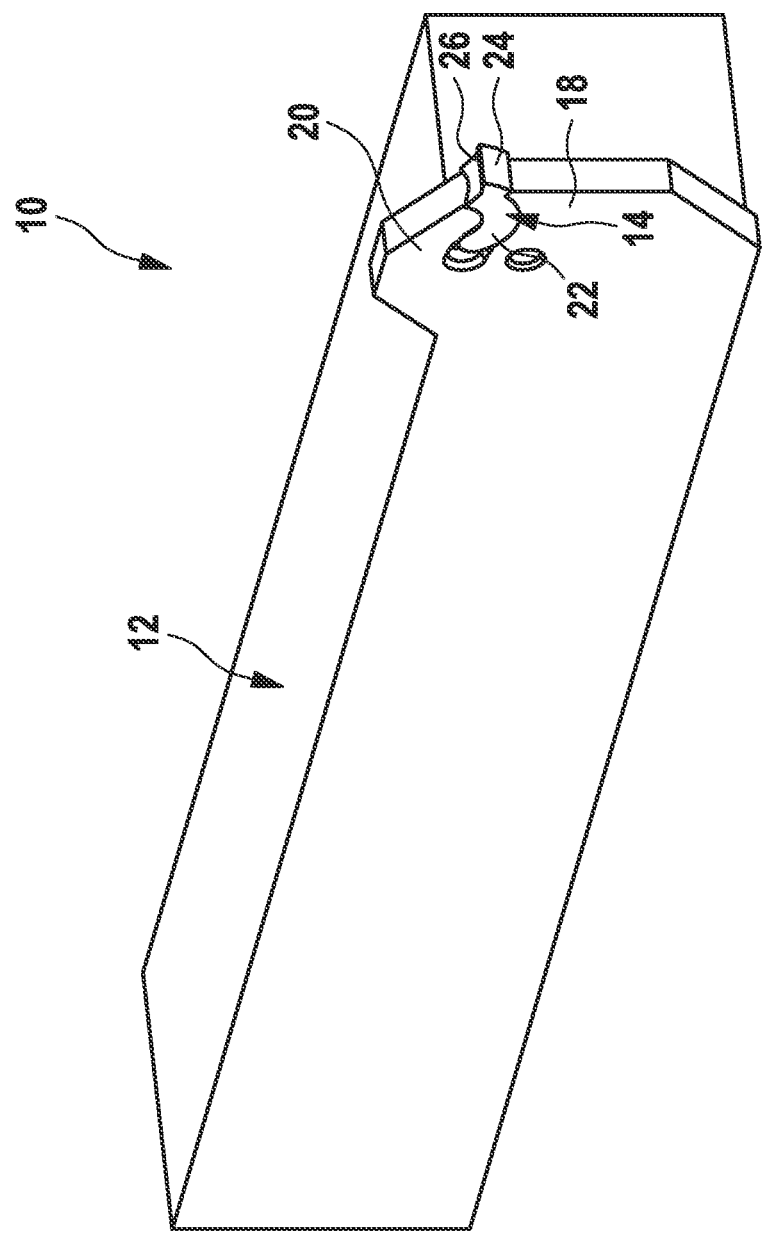
FIG. 1 shows a perspective view of a the tool according to the present disclosure.

FIG. 1 shows a perspective view of a tool according to the disclosure, which is denoted in its entirety by the reference numeral 10. The tool 10 according to the disclosure is predominantly used for plunge-cut turning or longitudinal turning. It has a holder 12 and a therein disposed cutting insert 14. The cutting insert 14 is disposed in a receptacle 16 provided on the front end of the holder 12. This slot-shaped receptacle 16 is formed by two substantially rigid clamping jaws, a lower clamping jaw 18 and an upper clamping jaw 20. The cutting insert 14 is held clamped between these two clamping jaws 18, 20.

The cutting insert 14 has a shank 22 and a cutting head 24 disposed on the workpiece-side end of the shank 22. On the face end of the cutting head 24 is arranged a rectilinear cutting edge 26. Regarded in a side view, both the receptacle 16 and the therein disposed shank 22 of the cutting insert 14 is of substantially arcuate, i.e. curved configuration. For the insertion of the cutting insert 14 into the receptacle 16, said cutting insert is pivoted between the two clamping jaws 18, 20 into the holder 12. In a similar (reverse) manner, the cutting insert 14 can also be released again from the holder 12.

Figure 2A:
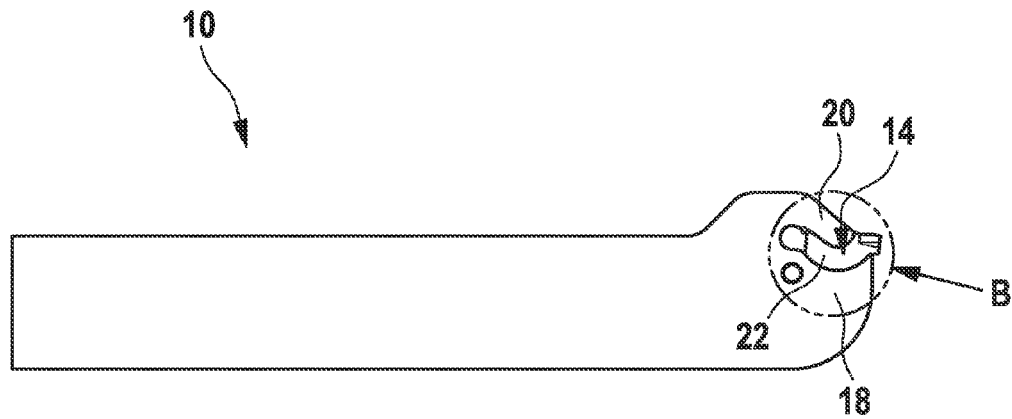
FIGS. 2A-2B show a side view (FIG. 2A) and a detailed view (FIG. 2B) of a first embodiment of the tool according to the disclosure with a therein inserted cutting insert.
Figure 2B:
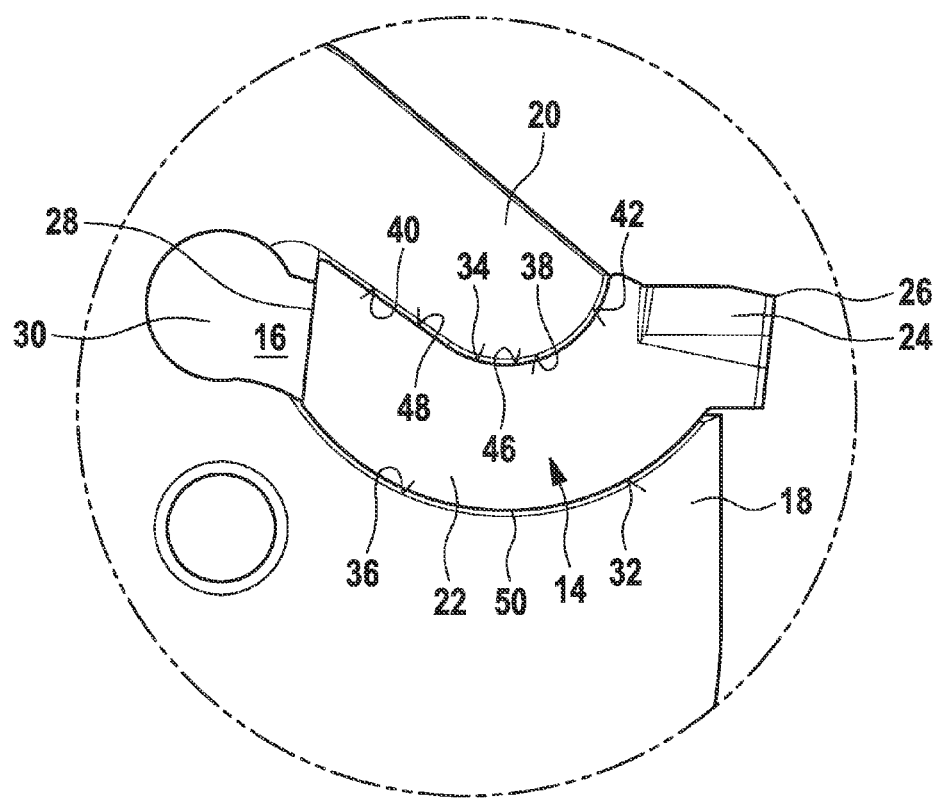
Figure 4A:
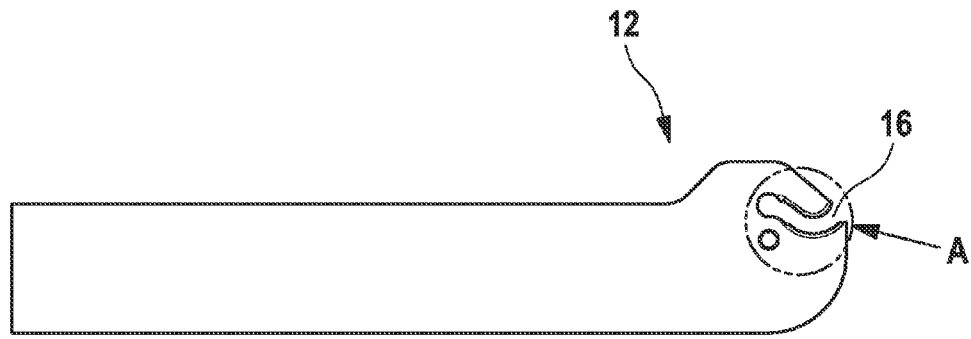
FIGS. 4A-4C show various views of the holder according to the disclosure (without therein inserted cutting insert) according to the first embodiment.
Figure 4B:
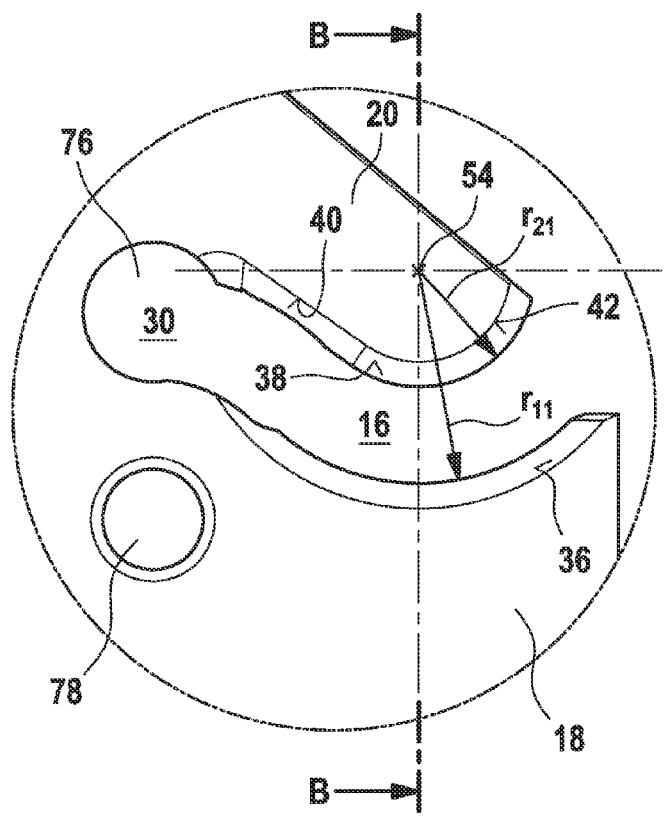
Figure 4C:
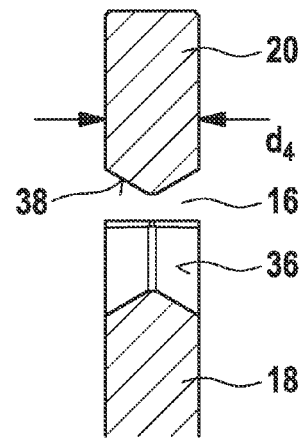
Figure 5A:
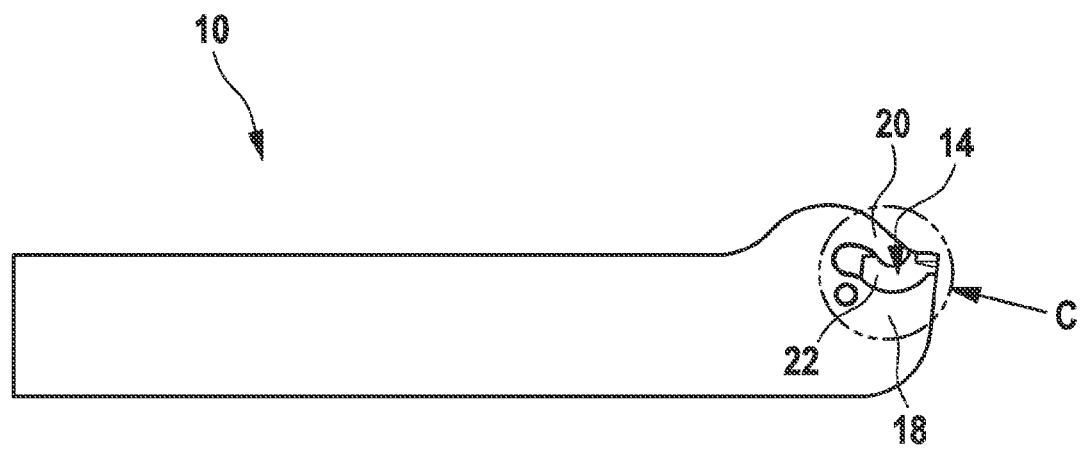
FIGS. 5A-5B show a side view (FIG. 5A) and a top view (FIG. 5B) of a second embodiment of the tool according to the disclosure with the therein inserted cutting insert.
Figure 7A:
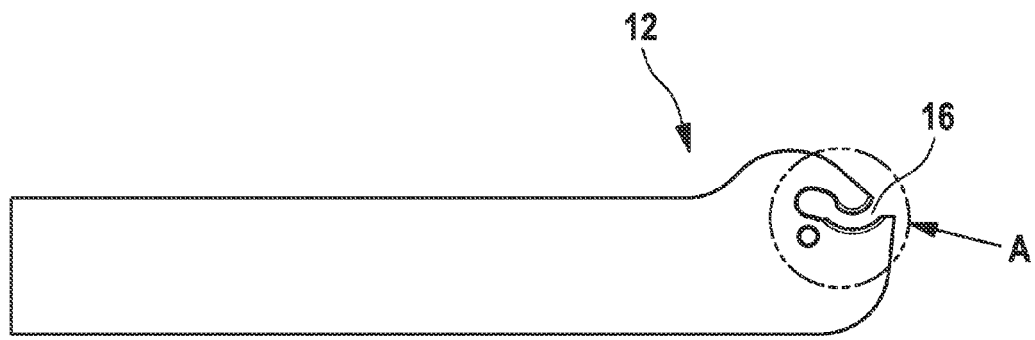
FIGS. 7A-7C show various views of the holder according to the disclosure (without therein inserted cutting insert) according to the second embodiment.
Figure 7B:
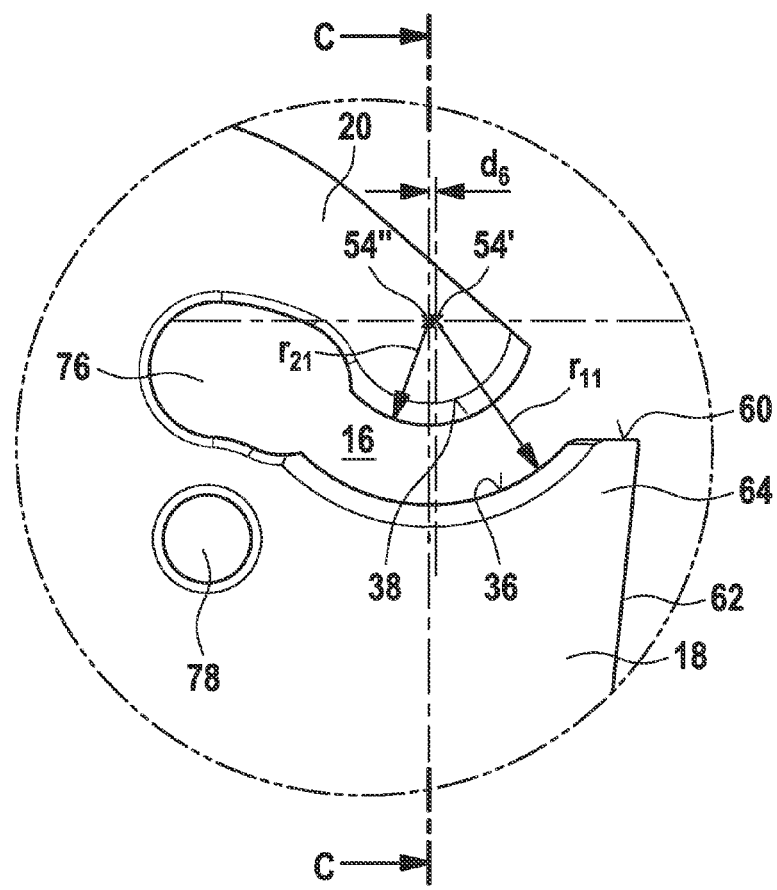
Figure 7C:
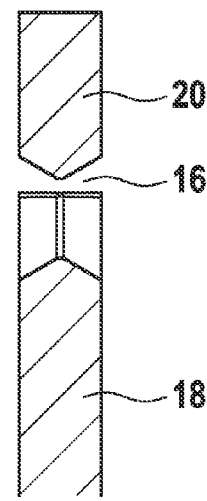
Figure 8A:
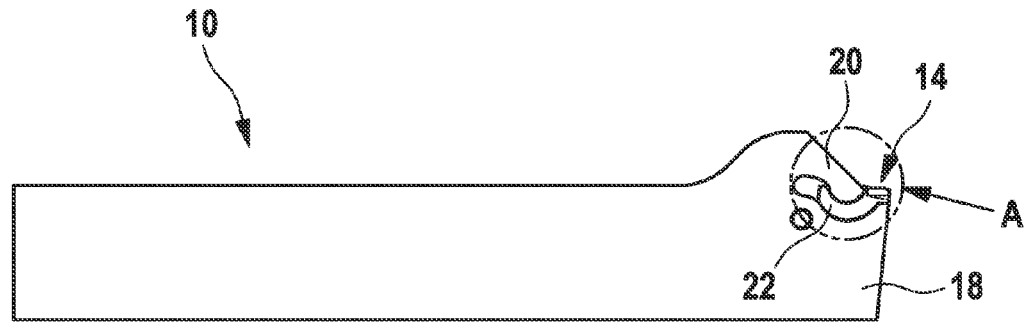
FIGS. 8A-8B show a side view (FIG. 8A) and a detailed view (FIG. 8B) of a third embodiment of the tool according to the disclosure with the therein inserted cutting insert.
Figure 9A:
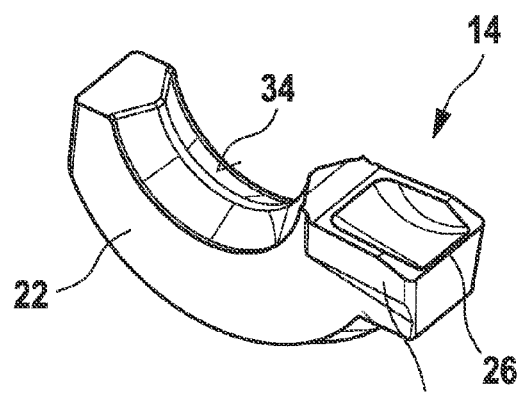
FIGS. 9A-9D show various views of the cutting insert according to the third embodiment.
Figure 9B:
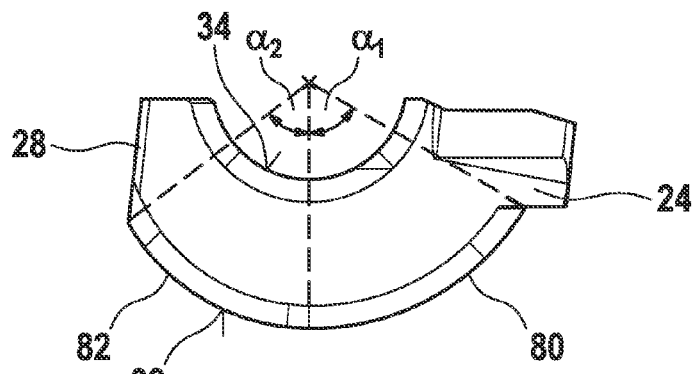
Figure 9C:
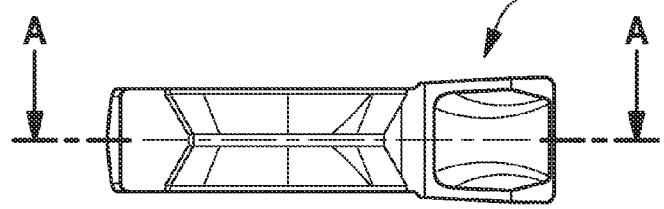
Figure 9D:
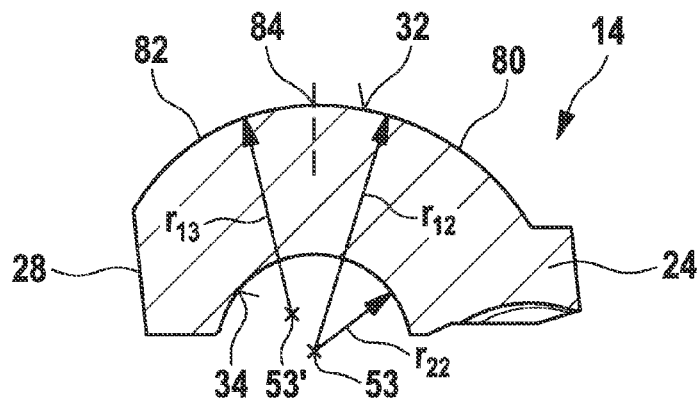
Figure 10A:
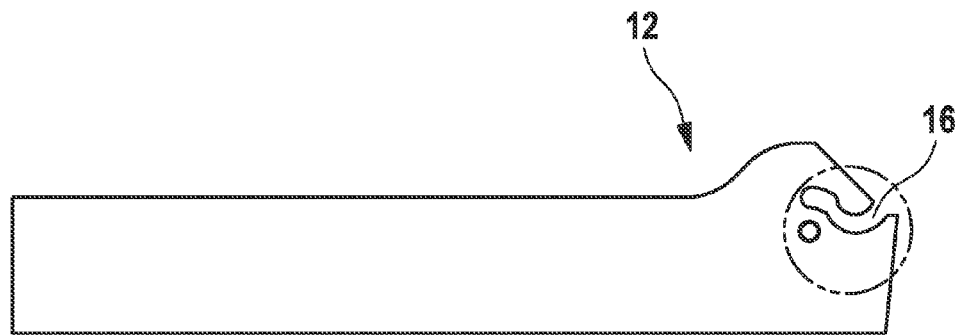
FIGS. 10A-10C show various views of the holder according to the disclosure (without therein inserted cutting insert) according to the third embodiment.
Figure 10B:
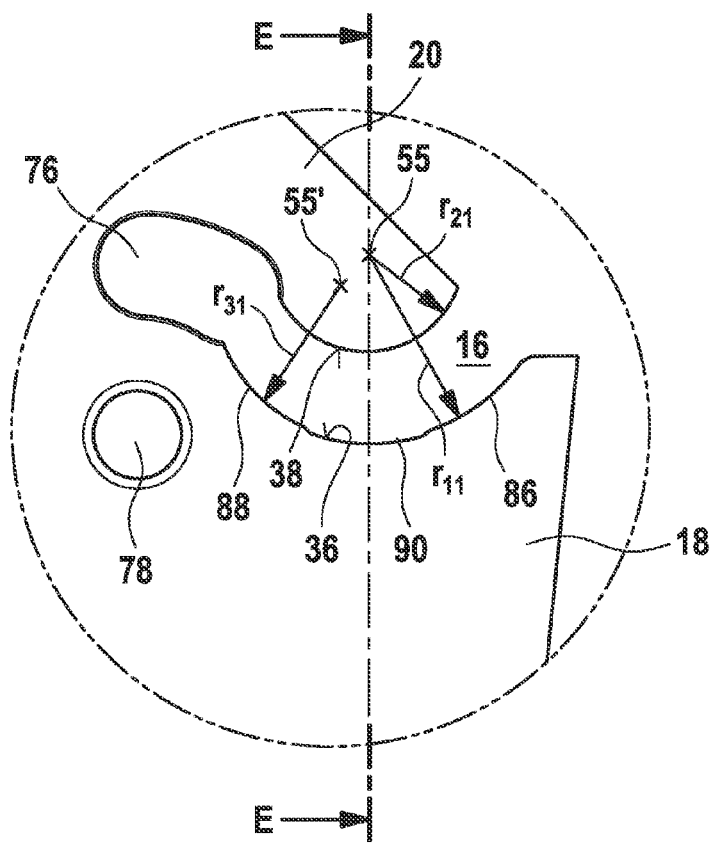
Figure 10C:
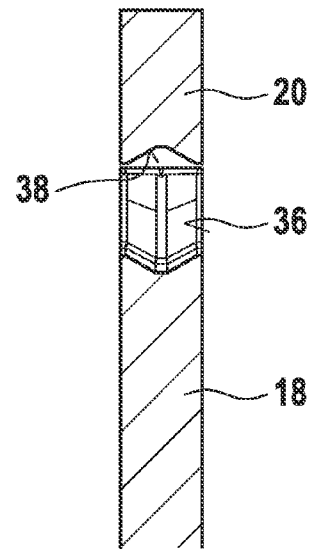

FIGS. 2 to 10 show exemplary embodiments of the tool 10 according to the present disclosure, wherein FIGS. 2 to 4 show the first embodiment, FIGS. 5 to 7 the second embodiment, and FIGS. 8 to 10 the third embodiment. In FIG. 2A, the tool 10, together with the holder 12 and the therein inserted cutting insert 14 according to the first embodiment, is shown in a side view. FIG. 2B shows the associated detailed view, which is indicated with "B" in FIG. 2.

From FIG. 2B it is can be seen that the receptacle 16 extends over a larger angular range than the arcuate shank 22 of the cutting insert 14. As can be seen from FIG. 3B, which shows the cutting insert 14 from the side, at least the bottom side of the shank 22 of the cutting insert 14 extends along an arc which has the included angle α. This schematically delineated included angle α has a magnitude of at least 90°. As can be seen from FIG. 2B, the associated angular range of the receptacle 16 is configured larger. The shank 22 is therefore held in the receptacle 16 such that the holder-side end of the shank 22, which is denoted by the reference numeral 28, is distanced from the holder-side end of the receptacle 16 (denoted by reference numeral 30). The face end 28 situated opposite the cutting head 24 of the cutting insert 14 (in the present case referred to as the holder-side end 28 of the shank 22) therefore has no contact with the holder 12. It thus does not bear against the holder 12.

According to the first embodiment, the cutting insert 14 or the shank 22 of the cutting insert 14 bears solely with its lower and upper locating faces 32, 34 against the receptacle 16 formed by the clamping jaws 18, 20. These lower and upper locating faces 32, 34 of the shank 22 can be seen in detail in FIGS. 3A-3D, in which the cutting insert 14 is shown in isolation in different views. Correspondingly thereto, the holder 12 has a lower bearing surface 36, disposed on the lower clamping jaw 18 on the rim of the receptacle 16, and an upper bearing surface 38, disposed on the upper clamping jaw 20 on the opposite rim of the receptacle 16. These bearing surfaces 36, 38 are shown in enlarged representation in FIG. 4B, which shows the detail A indicated in FIG. 4A.

In the mounted state, the shank 22 of the cutting insert 14 thus bears with its lower locating face 32 positively against the lower bearing surface 36 and with its upper locating face 34 positively against the upper bearing surface 38 on the clamping jaws 18, 20 of the holder 12.

This above-described form closure is achieved only once the end position of the cutting insert 14 within the holder 12, as is represented in FIG. 2B, is reached. By "end position" is understood, in the present case, that mounted position of the cutting insert 14 in which the tool 10 is ready for use. In order to achieve in this position a precise and mechanically stable insert seat, the upper bearing surface 38 of the receptacle 16, according to the first embodiment, is at least in part rectilinearly configured in the region of the holder-side end 30. This rectilinear, i.e. non-curved (non-arcuate) section of the upper bearing surface 38 is denoted by the reference numeral 40.

According to the first embodiment of the tool 10 as represented in FIGS. 2-4, the upper bearing surface 38 thus has in the front region an arcuate section 42 and in the rear region a rectilinear, non-curved section 40. Accordingly, a front section 46 of the upper locating face 34, which front section is disposed in the region of the workpiece-side end 44 of the cutting insert shank 22, is arcuately configured, and a section 48 of the upper locating face 34, which section is disposed in the region of the holder-side end 28, is rectilinearly configured (see in this regard, for instance, FIGS. 3B, 3D).

The rectilinearly configured sections 40, 48 of respectively the upper bearing surface 38 and the upper locating face 34 serve, according to the first embodiment of the tool 10, as an end stop. This end stop defines the end position or the mounted position of the cutting insert 14. In the mounted position, the cutting insert 14 accordingly bears with the rectilinear section 48 against the upper clamping jaw 20 and, in the region of the apex point of the lower locating face 32 (denoted by reference numeral 50), against the lower clamping jaw 18 of the holder 12. As a result, an exactly defined and mechanically stable contact is achieved. An extra limit stop on the face end 28, as is frequently provided in tools from the prior art, is not required here.

A further difference with respect to the tools known from the prior art consists in the fact that, for the clamping of the cutting insert 14 within the holder 12, no extra clamping screw has to be provided. Both the lower and the upper clamping jaw 18, 20 are in the present case both of substantially rigid configuration. An expansion of the clamping jaws 18, 20 for the insertion of the cutting insert 14 is therefore not provided here. The latter is merely pushed or pivoted into the receptacle 16 until the above-stated end position is reached. This can be achieved with the aid of a simple assembly lever, which is described in greater detail further below in relation to FIGS. 11 to 13.

As a result of the substantially rigid configuration of the clamping jaws 18, 20, the otherwise customary expansion slot, which, in the event of an elastic configuration of the upper clamping jaw 20, would otherwise be absolutely necessary, can thus also be dispensed with. This initially sounds trivial. In practice, however, the omission of such an expansion slot enables, however, a substantially more compact design of the holder head of the tool 10.

Figure 3A:
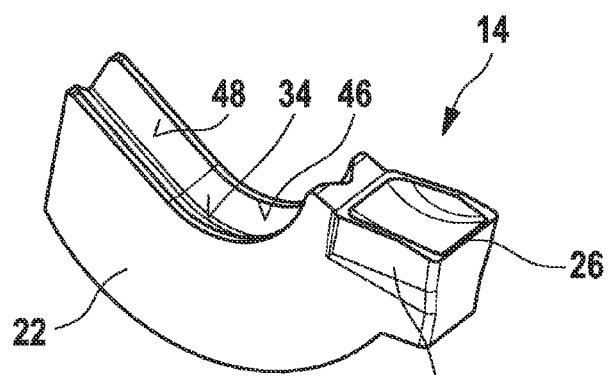
FIGS. 3A-3D show various views of the cutting insert according to the disclosure according to the first embodiment.
Figure 3B:
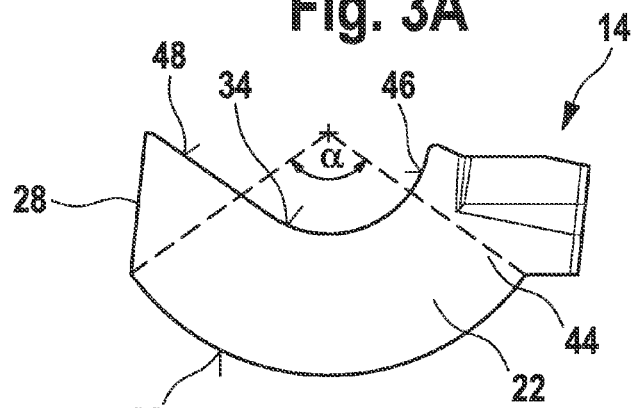
Figure 3C:
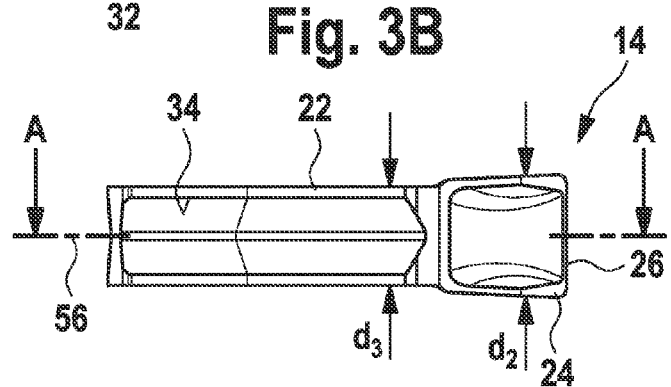
Figure 3D:
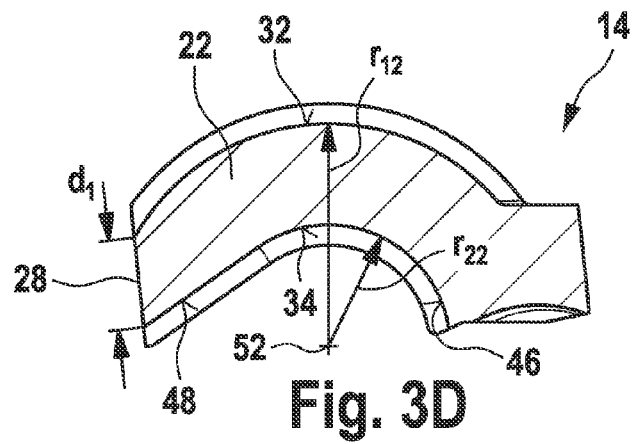

With respect to the first embodiment, it should also be mentioned that the arcuately configured lower bearing surface 36 has an equal-sized radius of curvature $r_{11}$ as the lower locating face 32 of the cutting insert shank 22 (compare radius of curvature $r_{12}$ in FIG. 3D). Similarly, also the arcuately configured section 42 of the upper bearing surface 38 has an equal-sized radius of curvature $r_{21}$ as the upper locating face 34 of the cutting insert shank 22 (see radius of curvature $r_{22}$ in FIG. 3D). The equal-sized radii of curvature $r_{11}$ and $r_{12}$ of respectively the lower bearing surface 36 and the lower locating face 32 are in the present case referred to as first radii of curvature $r_{11}$, $r_{12}$. By contrast, the equal-sized radii of curvature $r_{21}$, $r_{22}$ of respectively the upper bearing surface 38 and the upper locating face 34 are referred to as second radii of curvature $r_{21}$, $r_2$. According to the first embodiment represented in FIGS. 2 to 4, the first and second radii of curvature $r_{11}$, $r_{12}$ and $r_{21}$, $r_{22}$ respectively have the same (identical) centers of curvature or centers of radius 52, 54 (compare FIGS. 3D and 4B).

Since the lower locating face 32 of the cutting insert shank 22 is of continuously arcuate configuration (with radius $r_{12}$) and the rear section 48 of the upper locating face 34 is of rectilinear configuration, the shank 22 of the cutting insert 14 tapers somewhat in the region of the holder-side end 28. This is illustrated in particular in FIG. 3D by the delineated distance $d_1$. The distance $d_1$ is less than the difference between the two radii of curvature $r_{12}$ and $r_{22}$. In similar fashion the receptacle 16 tapers, on the basis of the continuously arcuately configured lower bearing surface 36 and the rectilinearly configured section 40 of the upper bearing surface 38, in the region of the holder-side end 30.

From FIGS. 3 and 4, the following further features are evident: As can be seen in particular in FIG. 3C, the cutting head 24, in at least a direction transversely to the lead-in direction 56 of the shank 22, is configured wider than the shank 22 and the opening of the receptacle 16 in this direction. The shank 22 itself is in this direction likewise configured larger than the receptacle 16 in the same direction. This produces the following size relationship: $d_2 > d_3 > d_4$ (compare FIGS. 3C and 4C). This size relationship substantially has the purpose that both the cutting head 24 and the shank 22 laterally protrude somewhat over the boundary surfaces of the clamping jaws 18, 20, and thus an undesirable collision of the holder 12, for instance during the plunge-cut turning, is prevented. By comparing FIGS. 4C and 3A, C, it becomes additionally apparent that both the lower bearing surface 36 and lower locating face 32 and the upper bearing surface 38 and upper locating face 34 respectively have mutually corresponding cross-sectional profiles. These cross-sectional profiles are preferably of V-shaped configuration. Each bearing surface or locating face 32, 34, 36, 38 thus respectively has two flanks, which taper to a point and which, in particular, effectively prevent a lateral release of the cutting insert 14 from the holder 12.

FIGS. 5-7 show a second embodiment of the tool 10 according to the disclosure. Same or similar components which appear also according to the first embodiment (see FIGS. 2-4) are provided therein with the same reference symbols. In the following, essentially the differences of the second embodiment in comparison to the above-described first embodiment are described.

At first glance, the second embodiment equates to the first embodiment. Here too, an arcuately configured cutting insert 14, which can be arranged exchangeably in the likewise arcuately configured receptacle 16 of the holder 12, is employed. Just as according to the first embodiment of the tool 10 according to the disclosure, the clamping jaws 18, 20 are of substantially rigid configuration. Here too, in the region of the holder-side end 28 or 30, no limit stop is provided between the shank 22 of the cutting insert 14 and the holder 12.

Unlike in the first embodiment, both the lower contact and bearing surfaces 32, 36 and the upper contact and bearing surfaces 34, 38 are respectively of continuously arcuate configuration. A rectilinearly running part of the upper contact or bearing surface 34, 38 in the rear region of the shank 22 or of the upper clamping jaw 20 is not provided here.

Figure 5B:
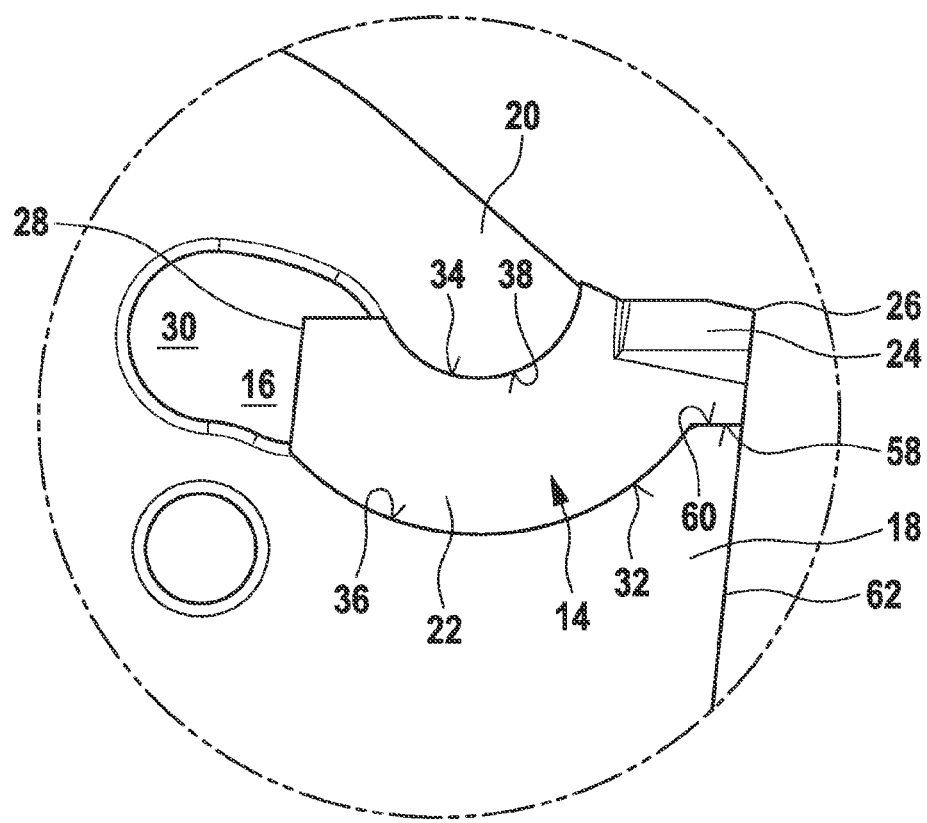
Figure 6A:
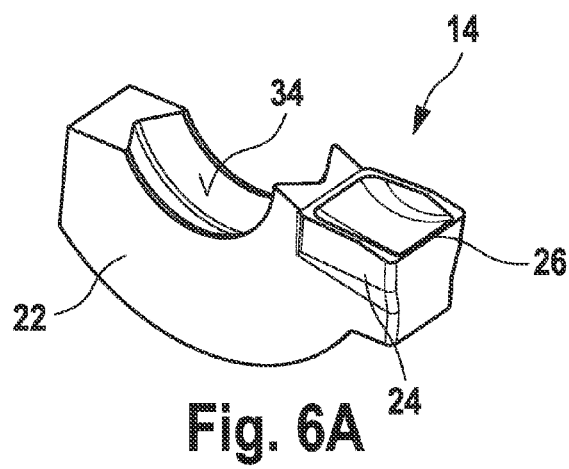
FIGS. 6A-6D show various views of the cutting insert according to the second embodiment.
Figure 6B:
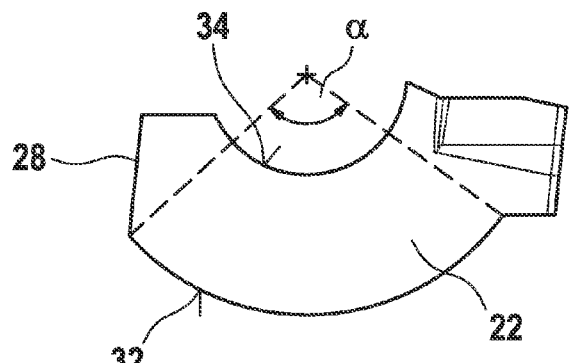
Figure 6C:
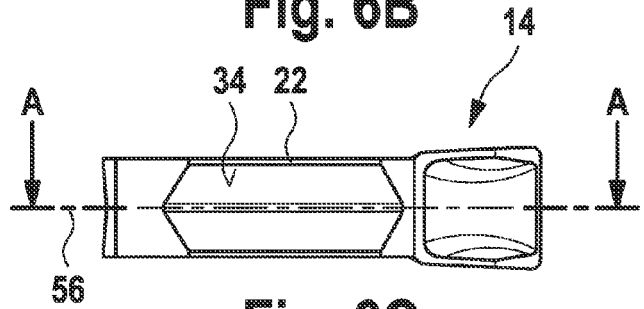
Figure 6D:
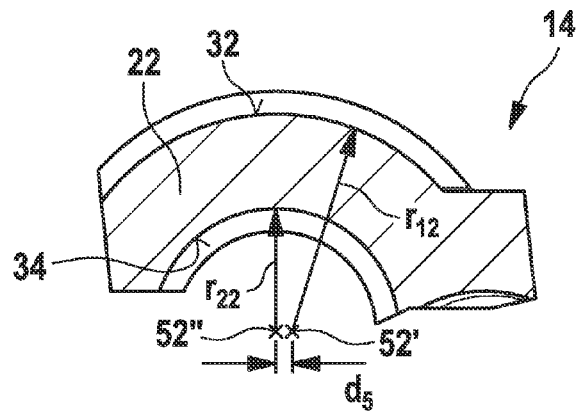

According to the second embodiment, a counterbearing surface 58 provided in the front region of the cutting insert 14 serves as a stop for the cutting head 24 (see, for instance, FIG. 5B). This counterbearing surface 58 is preferably disposed parallel to the cutting edge 26 beneath the cutting head 24. In the mounted state, this counterbearing surface 58 rests on a support surface 60. Said support surface 60 is disposed on the workpiece-side end 62 of the lower clamping jaw 18, adjacent to the receptacle 16. For this purpose, on the workpiece-side end 62 on the lower clamping jaw 18 is arranged a projection 64, which extends the receptacle 16 in the forward direction (see in particular FIG. 7B).

According to the second embodiment, the stop between the cutting insert 14 and the holder 12 is thus provided in the front region, and not, as according to the first embodiment, in the rear region of the receptacle 16.

Moreover, the clamping force which in the mounted state is generated between the clamping jaws 18, 20 and the cutting insert 14 is increased by a slightly offset arrangement of the centers of the radii of curvature of the upper and lower contact and bearing surfaces 32, 34, 36, 38. As is evident, for instance, from FIG. 6D, the radius of curvature $r_{12}$ of the lower locating face 32 and the radius of curvature $r_{22}$ of the upper locating face 34 have different center points. This is represented exaggeratedly in FIG. 6D by the distance $d_5$ (not true-to-scale). In reality, the center of curvature 52' of the lower locating face 32 is offset only by a few hundredths from the center of curvature 52" of the upper locating face 34.

In similar fashion the center of curvature 54' of the lower bearing surface 36 of the holder 12 is also offset by a few hundredths from the center of curvature 54" of the upper bearing surface 38. This is represented exaggeratedly in FIG. 7B by the distance $d_6$ (not true-to-scale). Preferably, the offset of the centers of curvature 52', 52" is precisely opposite to the offset of the centers of curvature 54', 54". As a result, the clamping effect can be additionally increased.

Although this is not explicitly evident from the Figures, according to the second embodiment it is similarly provided that also the radius of curvature of the lower bearing surface 36 and the radius of curvature $r_{12}$ of the lower locating face 32 have different center points 52', 54'. Similarly, it is preferably provided that also the radius of curvature $r_{21}$ of the upper bearing surface 38 and the radius of curvature $r_{22}$ of the upper locating face 34 have different center points 52", 54". Preferably, these centers of curvature are also therefore slightly offset from one another.

It should be pointed out, however, that not all the above-stated centers of curvature 52', 52" and 54', 54" must definitely be mutually offset.

As a result of the above-described offset arrangement of the centers of curvature 52', 52", 54', 54", the clamping force during the insertion of the cutting insert 14 rises increasingly until the end position is reached and the counterbearing surface 58 abuts against the support surface 60. In this case, too, an optimally defined and mechanically stable insert seat is thereby achieved. Even if one of the clamping jaws 18, 20, due to material fatigue over the course of time, were to yield a little, then this would merely result in the cutting insert 14 sliding slightly further inward into the receptacle 16. The hereby slightly altered tip height is virtually negligible.

The remaining parts of the receptacle 16, as well as also the cross-sectional profile represented in FIG. 7C, equate to the first embodiment. Similarly, in the second embodiment also, the arcuate receptacle 16 and the arcuate shank 22 extend, measured respectively on the lower bearing surface 36 of the receptacle 16 and the lower locating face 32 of the cutting insert 14, extend respectively over at least 90°. As can be seen from FIG. 5B, the receptacle 16 here too extends over a larger angular range than the shank 22 of the cutting insert, so that the shank 22 is held in the receptacle 16 such that the holder-side end 28 of the shank 22 is distanced from the holder-side end 30 of the receptacle 16. Moreover, it should be pointed out that, despite the offset centers of curvature 52', 52", 54', 54", the radii of curvature and $r_{12}$ and $r_{21}$ and $r_{22}$ are respectively equally large.

In FIGS. 8-10, a third embodiment of the tool 10 according to the disclosure is represented. Here too, same or similar components, which also appear according to the first two embodiments, are provided with the same reference symbols.

In much the same way as in the second embodiment shown in FIGS. 5-7, the limit stop between the cutting insert 14 and the holder 12 is also according to the third embodiment provided in the front region. For this purpose, the cutting insert 14 has in its front region a counterbearing surface 58, with which the cutting insert 14, in the mounted state, bears on a support surface 60 which is disposed on the workpiece-side end 62 of the lower clamping jaw 18, adjacent to the receptacle. According to the third embodiment shown in FIGS. 8-10, the lower and upper locating faces 32, 34 of the cutting insert shank 22 are likewise of continuously curved or arcuate configuration. Unlike in the second embodiment shown in FIGS. 5-7, the lower locating face 32 of the shank 22 does not however have a uniform curvature along its periphery.

As is evident, in particular, from FIGS. 9B and D, the lower locating face 34 of the cutting insert shank 22 has two different, likewise arcuately running portions 80, 82, which in the present case are also referred to as locating portions 80, 82. These two portions 80, 82 are differently curved. They thus have different radii of curvature. The first locating portion 80 runs from the cutting head 24 of the cutting insert 14 and spans the front region of the bottom side of the cutting insert shank 22. By contrast, the second locating portion 82 spans the rear region of the bottom side of the cutting insert shank 22 up to the holder-side end 28. In other words, the first arcuate locating portion 80 extends over a first angular range $\alpha_1$ and the second arcuate locating portion 82 extends over a second angular range $\alpha_2$ (see FIG. 9B). The two angular ranges $\alpha_1$ and $\alpha_2$ are not mutually overlapping. Preferably, the two arcuate portions 80, 82 directly adjoin each other. The two portions 80, 82 pass into each other preferably in the region of the apex 84 of the lower locating face 32.

A fundamental feature of this third embodiment consists in the fact that the first locating portion has a first radius of curvature $r_{12}$, which differs from the radius of curvature $r_{13}$ of the second locating portion 82. In addition, the two portions 80, 82 have preferably different centers of curvature 53 and 53' (see FIG. 9B). The center of curvature 53 of the first portion of the lower locating face 32 preferably coincides with the center of curvature of the upper locating face 34. By contrast, the center of curvature 53' of the second portion of the lower locating face 32 is preferably offset both in the longitudinal direction (X-direction) and in the transverse direction (Y-direction). Similarly, it is preferred that the radius of curvature $r_{13}$ of the second locating portion 82 is smaller than the radius of curvature $r_{12}$ of the first locating portion 80. As a result, the rear region of the shank 22 close to the holder-side end 28 thus tapers in a wedge shape.

Due to the larger curvature (smaller radius of curvature $r_{13}$) in the rear region of the shank 22, when the cutting insert 14 is pushed or inserted into the receptacle 16, a wedge effect is obtained, which wedge effect increases until the end position in which the counterstop 58 bears against the support surface 60 is reached. This increased wedge effect enables an improved and more stable insert seat of the cutting insert 14.

The lower and upper bearing surfaces 36, 38 of the receptacle 16 are configured correspondingly thereto. According to the third embodiment, the lower bearing surface 36 of the receptacle 16 also has two portions 86, 88, which extend over different, mutually separate (i.e. non-overlapping) angular ranges. For the purpose of linguistic differentiation from the abovementioned locating portions, these two portions 86, 88 are in the present case also referred to as bearing portions 86, 88.

Here too, the first bearing portion 86 disposed in the front region of the receptacle 16 has a lesser curvature than the second bearing portion 88 provided in the rear region of the receptacle 16. The radius of curvature $r_{31}$ of the second bearing portion 88 is thus smaller than the radius of curvature $r_{11}$ of the first bearing portion 86. In much the same way as is realized on the lower locating face 32 of the cutting insert shank 22, the bearing portions 86, 88 provided on the lower bearing surface 36 of the receptacle 16 also have different centers of curvature. The first portion 86 preferably has the same center of curvature 55 as the upper bearing surface 38. The center of curvature 55' of the second portion 88 is arranged offset therefrom.

Unlike the lower locating face 32 of the cutting insert shank 22, the two arcuate portions 86, 88 provided on the lower bearing surface 36 are, however, separate from each other. They thus do not pass tangentially directly one into the other. As is evident, in particular, from FIGS. 8B and 10B, the two bearing portions 86, 88 are separated from each other by a recess 90. This recess 90 runs transversely, i.e. preferably orthogonally to the holder longitudinal axis through the lower bearing surface 36 of the receptacle 16. The recess 90 is preferably configured as a depression. The floor of the recess 90 is thus partially set back from the surfaces of the two bearing portions 86, 88.

Figure 8B:
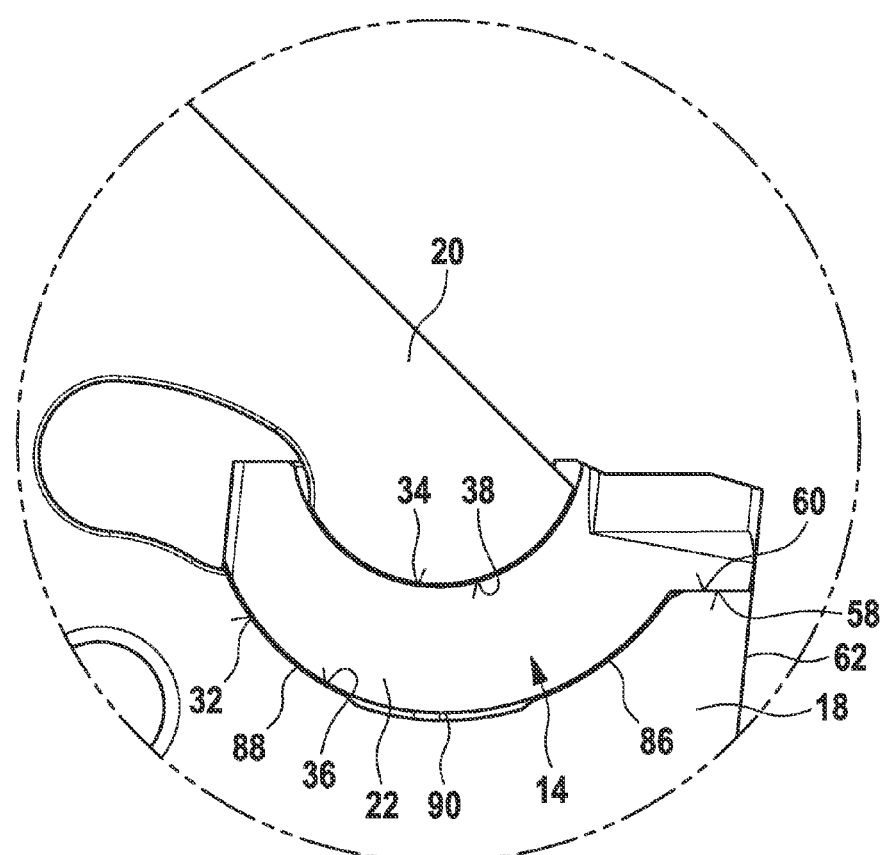

The sense and purpose of this recess 90 can best be inferred from the detailed view represented in FIG. 8B. On the one hand, the cutting insert 14, due to this recess 90, can be more easily inserted into the receptacle 16. Above all, however, the recess 90 prevents the cutting insert shank 22, including in the region of its lower apex 84, from resting on the receptacle 16 of the tool holder 12. In the fully inserted state of the cutting insert 14, the cutting insert shank 22 thus bears against the clamping jaws 18, 20 "only" on the upper bearing surface 38 and along the two portions 86, 88 of the lower bearing surface 36. This produces a type of three-point bearing, which guarantees an optimal insert seat. An unintentional release of the cutting insert 14 from the receptacle 16 of the tool holder 12 is thereby effectively prevented. Similarly, the force transmission into the tool holder 12 of the forces which arise on the cutter 26 during the machining is thereby optimized. Self-evidently, as already mentioned above, the cutting insert 14 rests with the bottom side of the cutting head 24 additionally on the counterbearing surface 60 in the front region of the lower clamping jaw 18.

A further difference from the first two embodiments consists in the fact that the cross sections of the lower and upper contact and bearing surfaces 32, 34 and 36, 38 are differently configured. These are namely, so to speak, inversely configured. According to the third embodiment, the lower and upper locating face 32, 34 of the cutting insert shank 22 is namely configured with a concave cross section, whereas the lower and upper bearing surface 36, 38 are configured with respectively convex cross sections. In much the same way as according to the first two embodiments, the cross sections are here respectively of substantially V-shaped configuration. Self-evidently, however, other prismatic cross sections for the respective contact and bearing surfaces 32, 34 and 36, 38 can also be chosen.

Figure 11A:
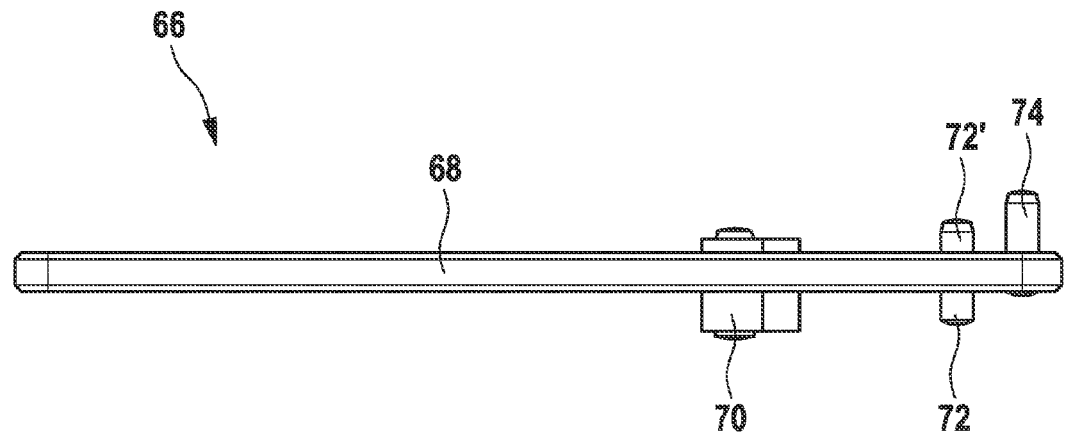
FIGS. 11A-11B show an assembly lever which can be used for the installation and removal of the cutting insert, in various views (FIG. 11A and FIG. 11B)
Figure 11B:
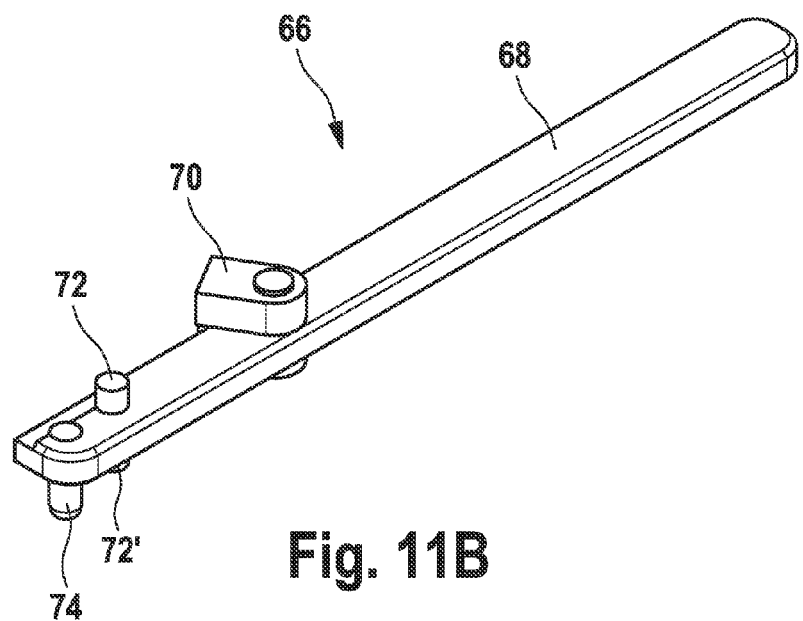

In FIGS. 11A and 11B, a side view and a perspective view of an assembly lever 66 is represented. This assembly lever 66 can be used both for the installation and for the removal of the cutting insert 14 on or from the holder 12. The assembly lever 66 has an elongated lever element 68, on which a plurality of pins 72, 72', 74 are disposed. These pins 72, 72', 74 can be inserted into the borehole 76 provided in the receptacle 16 and into the borehole 78 provided in the holder 12 (see, for instance, FIGS. 4B and 7B). Furthermore, the assembly lever 66 has a movably mounted anvil 70, which in the installation of the cutting insert 14 is placed against this latter. The anvil 70 is preferably made of brass in order to avoid damage to the cutting edge 26 during the installation.

Figure 12A:
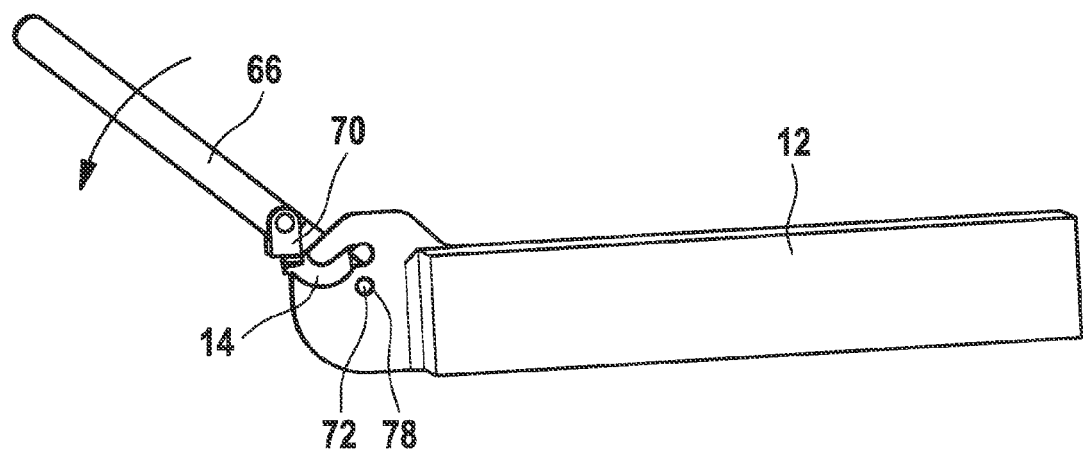
FIGS. 12A-12B show various views (FIG. 12A and FIG. 12B) for illustrating the installation of the cutting insert.
Figure 12B:
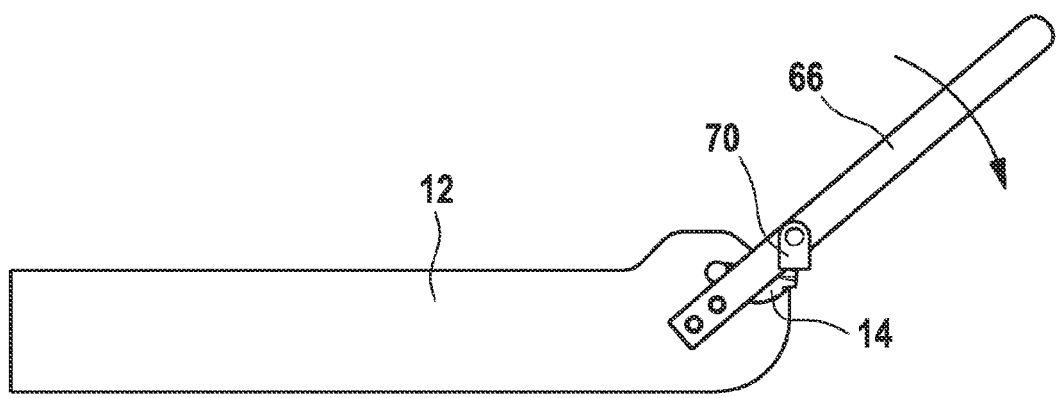

FIGS. 12A and 12B illustrate the installation process, in which the cutting insert 14 is clamped in the receptacle 16 of the holder 12. To this end, the pin 72 is inserted into the borehole 78 and the anvil 70 is placed against the top side of the cutting head 24 of the cutting insert 14. As a result of the pivot motion of the lever element 68, as represented in FIGS. 12A, B, the cutting insert 14 can thus be clamped in the holder 12 in a simple manner, with only small force expenditure, until the end position is reached. The center of rotation of the lever motion is here the pin 72 inserted in the borehole 78.

Figure 13A:
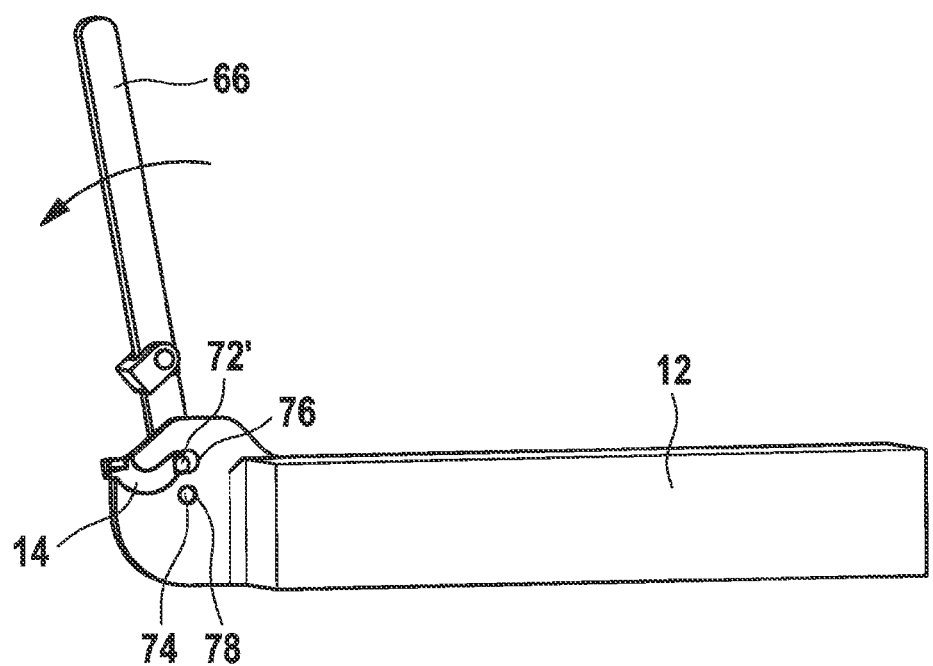
FIGS. 13A-13B show various views (FIG. 13A and FIG. 13B) for illustrating the removal process of the cutting insert.
Figure 13B:
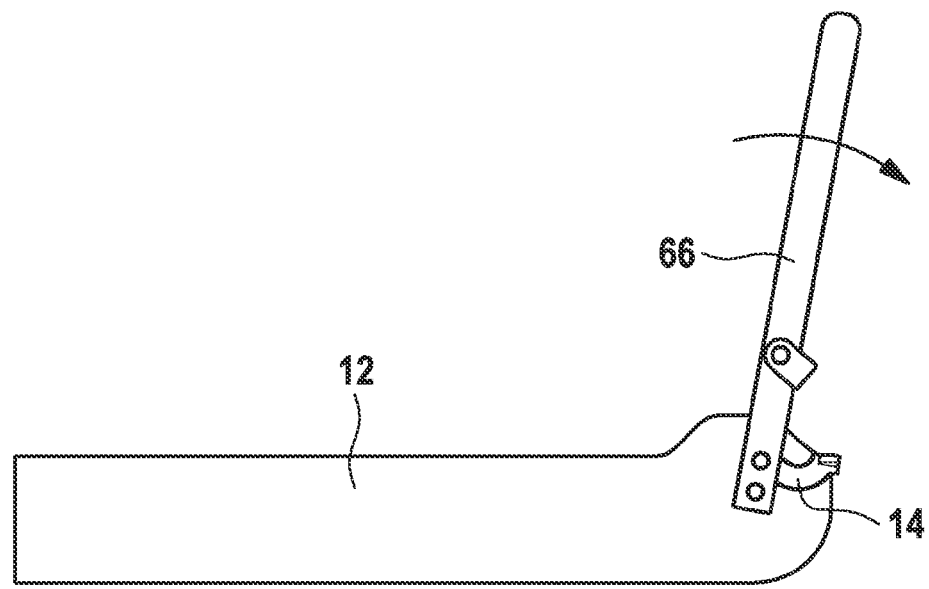

In similar fashion the cutting insert 14 can be released again from the holder with the aid of the assembly lever 66. In this case, as represented in FIGS. 13A, B, the pin 74 is inserted into the borehole 78 and the pin 72' is inserted into the borehole 76. Then the assembly lever 66 is pivoted about the pin 74 inserted in the borehole 78. As a result of this pivot motion, the cutting insert 14 is pushed out of the cutting insert receptacle 16 with the aid of the pin 72'. One and the same assembly lever 66 can thus be used both for installation and for removal of the cutting insert 14.

The inventors have thus succeeded in providing an innovative turning tool comprising an arcuately configured insert, which turning tool is distinguished, in particular, by a mechanically stable insert seat and an, in overall terms, compact construction. Also the tool which is used to exchange the insert is of relatively simple configuration and easy to handle. On the basis of the self-clamping principle, further fastening means for the insert can be dispensed with. Due to the rigidly configured clamping jaws, the holder according to the disclosure is altogether very stable.

What is claimed is:

1. A cutting tool comprising:
a cutting insert having an arc-shaped shank and a cutting head which is arranged on a first end of the shank and comprises a cutting edge, wherein the shank comprises an upper locating face and a lower locating face, wherein the lower locating face follows a first radius of curvature for the arc-shaped shank and the upper locating face follows a second radius of curvature for the arc-shaped shank, wherein the first radius of curvature is larger than the second radius of curvature, wherein a first center point of the first radius of curvature and a second center point of the second radius of curvature are each disposed outside of a geometry of the shank, wherein the lower locating face extends over an angular range of more than 90°, and
a holder having a rigid upper clamping jaw and a rigid lower clamping jaw which together define a slot-shaped, arc-shaped receptacle for receiving the cutting insert, wherein the cutting insert may be inserted into the holder at a front end of the receptacle, wherein the receptacle terminates within the holder at a back end, wherein the receptacle has an upper bearing surface which is arranged at the upper clamping jaw, wherein the upper bearing surface rests against the upper locating face of the cutting insert when the cutting insert is inserted into the holder, and wherein the receptacle has a lower bearing surface which is arranged at the lower clamping jaw, wherein the lower bearing surface rests against the lower locating face of the cutting insert when the cutting insert is inserted into the holder, and wherein the lower bearing surface extends over an angular range of more than 90°;
wherein the receptacle of the holder extends over a larger angular range than the shank of the cutting insert, and wherein the shank of the cutting insert is held in the receptacle of the holder such that a second end of the shank opposite the first end is distanced from the back end of the receptacle.

2. The cutting tool as claimed in claim 1, wherein the lower bearing surface and the lower locating face have an equal-sized first radius of curvature, and wherein the upper bearing surface and the upper locating face have an equal-sized second radius of curvature.

3. The cutting tool as claimed in claim 1, wherein at least one of the upper and the lower bearing surface of the receptacle comprises one or more planar surface parts in a region adjacent to the back end of the receptacle.

4. The cutting tool as claimed in claim 1, wherein at least one of the upper and the lower locating face of the shank comprises one or more planar surface parts in a region adjacent to the second end of the shank.

5. The cutting tool as claimed in claim 1, wherein at least one of the receptacle and the shank tapers towards the back end.

6. The cutting tool as claimed in claim 1, wherein the lower bearing surface passes over into a planar, flat surface which is part of a projection that is arranged at the lower clamping jaw at the front end of the receptacle, said planar, flat surface acts as a limit stop for the cutting head.

7. The cutting tool as claimed in claim 2, wherein the first radius of curvature of the lower bearing surface and the first radius of curvature of the lower locating face have different center points.

8. The cutting tool as claimed in claim 2, wherein the second radius of curvature of the upper bearing surface and the second radius of curvature of the upper locating face have different center points.

9. The cutting tool as claimed in claim 2, wherein the first radius of curvature of the lower bearing surface and the second radius of curvature of the upper bearing surface have different center points.

10. The cutting tool as claimed in claim 2, wherein the first radius of curvature of the lower locating face and the second radius of curvature of the upper locating face have different center points.

11. The cutting tool as claimed in claim 1, wherein the cutting head, in at least a direction parallel to the cutting edge, is configured wider than the receptacle in said direction.

12. The cutting tool as claimed in claim 1, wherein the lower bearing surface and the lower locating face have corresponding cross-sectional profiles, and/or wherein the upper bearing surface and the upper locating face have corresponding cross-sectional profiles.

13. The cutting tool as claimed in claim 1, wherein the shank protrudes laterally on at least one side over the receptacle when the cutting insert is inserted into the holder.

14. The cutting tool as claimed in claim 1, wherein the lower locating face of the arc-shaped shank comprises a first locating portion, which extends over a first angular range of the arc-shaped shank and the first radius of curvature, and a second locating portion, which extends over a second angular range of the arc-shaped shank and the second radius of curvature, wherein the second radius of curvature is different from the first radius of curvature, and wherein the first radius of curvature of the first locating portion and the second radius of curvature of the second locating portion have different center points.

15. The cutting tool as claimed in claim 14, wherein the first locating portion passes tangentially into the second locating portion.

16. The cutting tool as claimed in claim 14, wherein the second locating portion has a smaller distance from the second end of the shank than the first locating portion.

17. The cutting tool as claimed in claim 14, wherein the first center point of the first radius of curvature and the second center point of the second radius of curvature coincide.

18. The cutting tool as claimed in claim 14, wherein the lower bearing surface of the receptacle has a first bearing portion, which extends over a first angular range of the arc-shaped receptacle, and has a second bearing portion, which extends over a second angular range of the arc-shaped receptacle, wherein the two bearing portions have mutually different radii of curvature and different centers of curvature, and wherein the first bearing portion is separated from the second bearing portion by a recess provided in the lower bearing surface.

19. A cutting insert for a cutting tool which comprises a holder with a rigid upper clamping jaw and a rigid lower clamping jaw which together define a slot-shaped, arc-shaped receptacle for receiving the cutting insert, wherein the cutting insert may be inserted into the holder at a front end of the receptacle, wherein the receptacle terminates within the holder at a back end,
  wherein the cutting insert has an a arc-shaped shank and a cutting head which is arranged on a first end of the shank and comprises a cutting edge, wherein the shank comprises an upper locating face and a lower locating face, wherein the lower locating face follows a first radius of curvature for the arc-shaped shank and the upper locating face follows a second radius of curvature for the arc-shaped shank, wherein the first radius of curvature is larger than the second radius of curvature, wherein a first center point of the first radius of curvature and a second center point of the second radius of curvature are each disposed outside of a geometry of the shank, wherein the lower locating face extends over an angular range of more than 90°,
  wherein the shank of the cutting insert extends over a smaller angular range than the receptacle of the holder, and
  wherein the shank of the cutting insert is configured such that it is held in the receptacle of the holder in a way that a second end of the shank opposite the first end is distanced from the back end of the receptacle.

20. A holder for a cutting tool,
  wherein the holder comprises a rigid upper clamping jaw and a rigid lower clamping jaw which together define a slot-shaped, arc-shaped receptacle for receiving a cutting insert which comprises an arc-shaped shank and a cutting head which is arranged on a first end of the shank and comprises a cutting edge, wherein the shank comprises an upper locating face and a lower locating face, wherein the lower locating face follows a first radius of curvature for the arc-shaped shank and the upper locating face follows a second radius of curvature for the arc-shaped shank, wherein the first radius of curvature is larger than the second radius of curvature, wherein a first center point of the first radius of curvature and a second center point of the second radius of curvature are each disposed outside of a geometry of the shank, wherein the lower locating face extends over an angular range of more than 90°, wherein the cutting insert may be inserted into the holder at a front end of the receptacle, wherein the receptacle terminates within the holder at a back end, wherein the receptacle has an upper bearing surface which is arranged at the upper clamping jaw, wherein the upper bearing surface rests against the upper locating face of the cutting insert when the cutting insert is inserted into the holder, and wherein the receptacle has a lower bearing surface which is arranged at the lower clamping jaw, wherein the lower bearing surface rests against the lower locating face of the cutting insert when the cutting insert is inserted into the holder, and wherein the lower bearing surface extends over an angular range of more than 90°;
  wherein the receptacle of the holder extends over a larger angular range than the shank of the cutting insert, and
  wherein the holder is configured such that the shank of the cutting insert is held in the receptacle of the holder in a way that a second end of the shank opposite the first end is distanced from the back end of the receptacle.

* * * * *